(12) United States Patent
Harakawa et al.

(10) Patent No.: US 11,901,774 B2
(45) Date of Patent: Feb. 13, 2024

(54) ROTOR WITH COIL AIRFLOW PATHS

(71) Applicants: KABUSHIKI KAISHA TOSHIBA, Tokyo (JP); Toshiba Energy Systems & Solutions Corporation, Kawasaki (JP)

(72) Inventors: Takashi Harakawa, Yokohama Kanagawa (JP); Shinji Kubo, Yokohama Kanagawa (JP); Yasuo Kabata, Yokohama Kanagawa (JP); Yoshihiro Taniyama, Tokyo (JP); Ryo Fuchimoto, Yokohama Kanagawa (JP); Koji Ando, Yokohama Kanagawa (JP)

(73) Assignees: KABUSHIKI KAISHA TOSHIBA, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 251 days.

(21) Appl. No.: 17/199,658

(22) Filed: Mar. 12, 2021

(65) Prior Publication Data
US 2021/0296952 A1    Sep. 23, 2021

(30) Foreign Application Priority Data
Mar. 17, 2020   (JP) ................................. 2020-046148

(51) Int. Cl.
  *H02K 1/32*   (2006.01)
  *H02K 3/24*   (2006.01)
  *H02K 9/16*   (2006.01)

(52) U.S. Cl.
  CPC ................. *H02K 1/32* (2013.01); *H02K 3/24* (2013.01); *H02K 9/16* (2013.01)

(58) Field of Classification Search
  CPC ........... H02K 1/32; H02K 1/325; H02K 3/24; H02K 9/16
  USPC ............................................... 310/52, 61, 59
  See application file for complete search history.

(56) References Cited

U.S. PATENT DOCUMENTS

| | | | |
|---|---|---|---|
| 5,477,095 A | 12/1995 | Kleinburger | |
| 5,685,063 A * | 11/1997 | Prole | H02K 15/0414 |
| | | | 310/58 |
| 6,204,580 B1 * | 3/2001 | Kazmierczak | H02K 3/24 |
| | | | 310/216.119 |

(Continued)

FOREIGN PATENT DOCUMENTS

| | | |
|---|---|---|
| JP | S44-003281 B | 2/1969 |
| JP | H07-170683 A | 7/1995 |

(Continued)

*Primary Examiner* — Michael Andrews
(74) *Attorney, Agent, or Firm* — Foley & Lardner LLP

(57) ABSTRACT

According to one embodiment, a rotor includes a coil slot, a sub-slot, and coil airflow paths arranged in the rotor axial direction. At least one coil airflow path among the coil airflow paths includes a first wall surface disposed on a core central portion side of a cooling gas inlet portion of the coil airflow path, a second wall surface disposed on the core central portion side of an inside of the coil airflow path, and located more on the rotor radially outward side and more on a core end portion side than the first wall surface, and a third wall surface configured to connect the first wall surface and the second wall surface, the third wall surface including a surface perpendicular to a rotor radial direction.

9 Claims, 22 Drawing Sheets

(56) References Cited

U.S. PATENT DOCUMENTS

| | | | | |
|---|---|---|---|---|
| 6,316,852 B1 * | 11/2001 | Semba | ................... | H02K 3/24 310/58 |
| 6,362,545 B1 | 3/2002 | Prole | | |
| 6,459,180 B1 * | 10/2002 | Mori | ................. | H02K 15/0414 310/201 |
| 2010/0096937 A1 * | 4/2010 | Kaminski | ............... | H02K 3/24 310/61 |
| 2015/0162804 A1 | 6/2015 | Tolpadi et al. | | |
| 2021/0296952 A1 | 9/2021 | Harakawa et al. | | |

FOREIGN PATENT DOCUMENTS

| | | | |
|---|---|---|---|
| JP | 2000-299951 | A | 10/2000 |
| JP | 2001-016813 | A | 1/2001 |
| JP | 3564915 | B2 | 9/2004 |
| JP | 2015-112006 | A | 6/2015 |
| JP | 2021-065072 | A | 4/2021 |
| JP | 2021-151011 | A | 9/2021 |

* cited by examiner

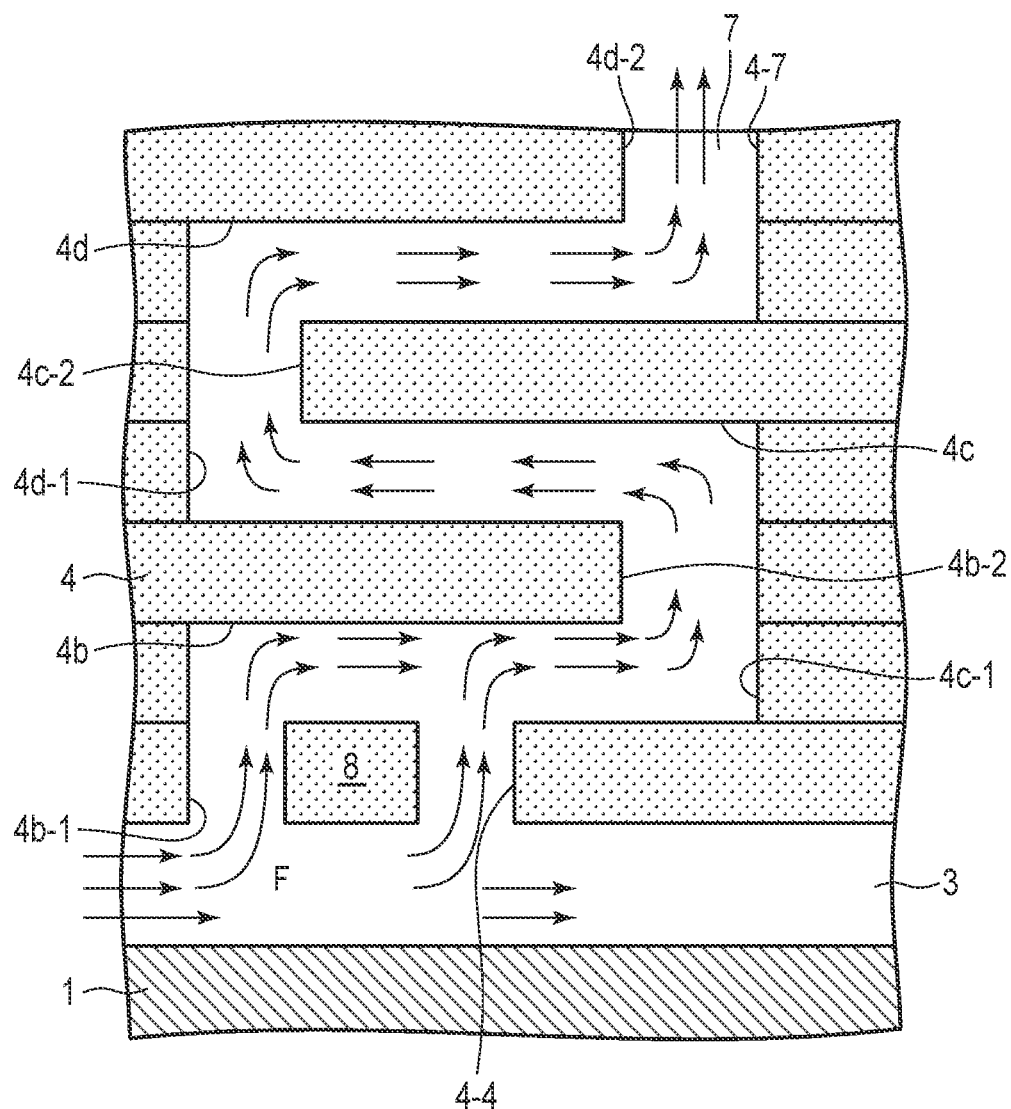
F I G. 12

H-H'

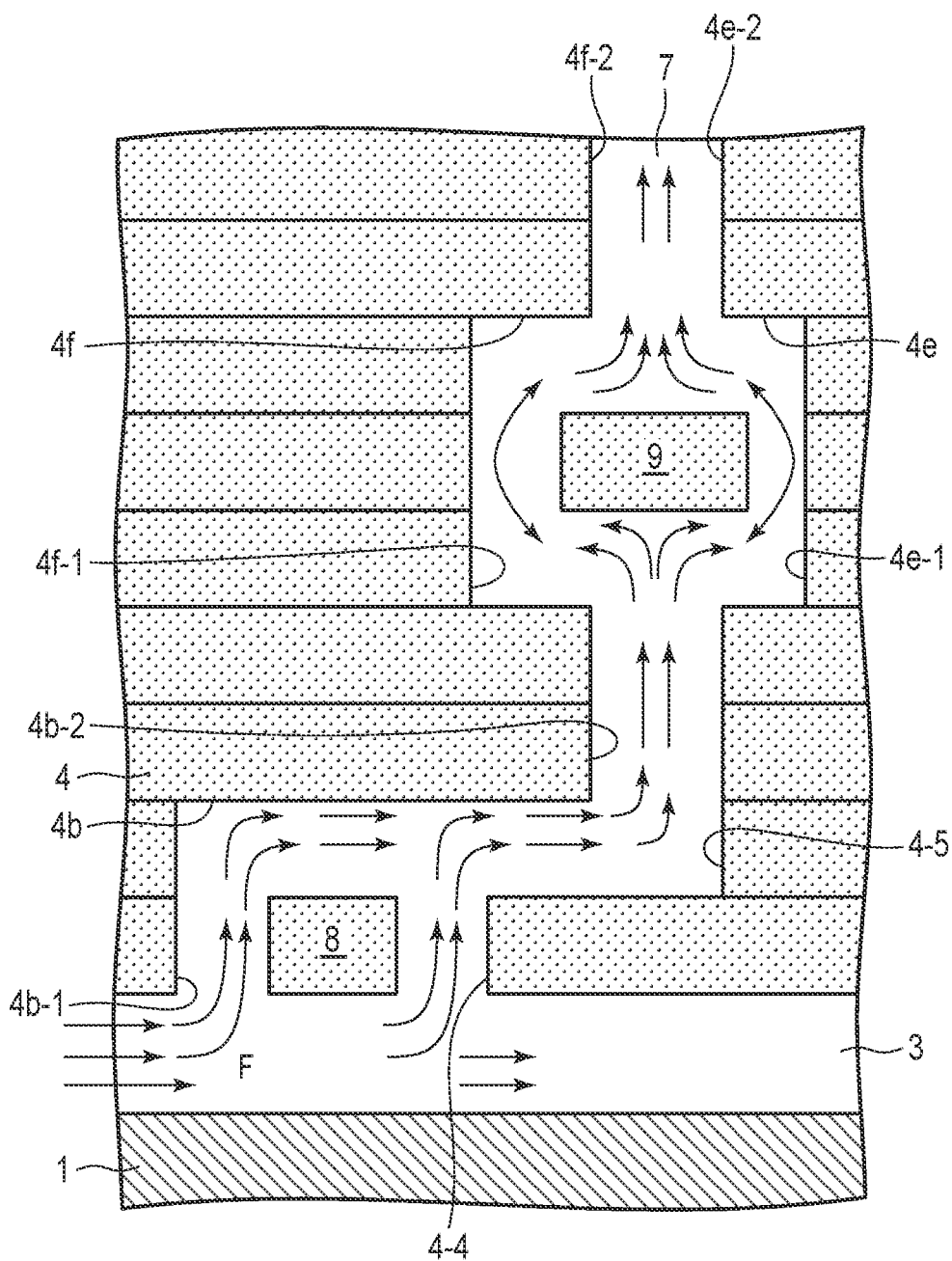
F I G. 15

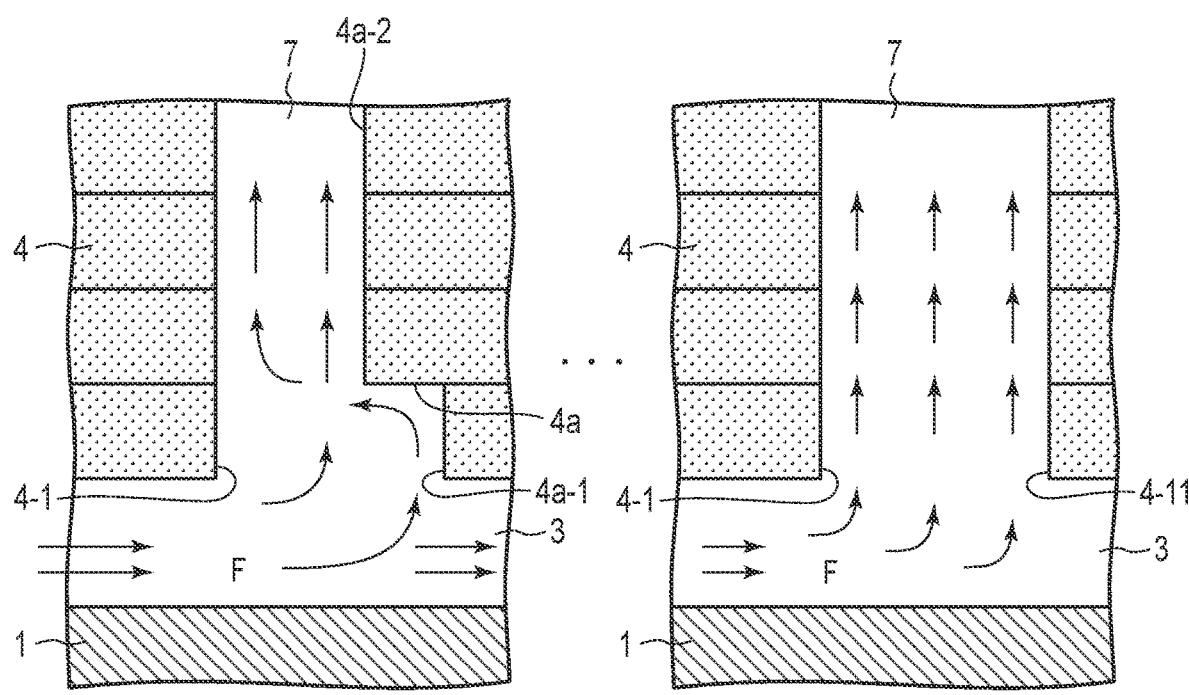
F I G. 20

ROTOR WITH COIL AIRFLOW PATHS

CROSS-REFERENCE TO RELATED APPLICATIONS

This application is based upon and claims the benefit of priority from Japanese Patent Application No. 2020-046148, filed Mar. 17, 2020, the entire contents of which are incorporated herein by reference.

FIELD

Embodiments described herein relate generally to a rotor of a rotating electrical machine.

BACKGROUND

FIG. 24 to FIG. 26 illustrate an example of a structure of a rotor of a general rotating electrical machine, for example, a turbine generator.

FIG. 24 is across-sectional view illustrating an example of a cross-sectional shape of a rotor core at a time when the rotor core is viewed in a rotor axial direction. FIG. 25 is a cross-sectional view illustrating, in enlarged scale, a vicinity of a coil slot shown in FIG. 24. FIG. 26 is a cross-sectional view illustrating an example of a cross-sectional shape of the rotor at a time when the rotor (in a range from one core end portion to a vicinity of a core central portion) is viewed in a rotor rotational direction.

As illustrated in FIG. 24, a plurality of coil slots 2 are disposed in a rotor core 1 at predetermined intervals in the circumferential direction of the rotor core 1, and a sub-slot 3 is provided on an inner peripheral side of each coil slot 2. A rotor coil 4 is stored in each coil slot 2.

As illustrated in FIG. 25, each rotor coil 4 is constructed by stacking a plurality of field conductors. The rotor coil 4 is insulated from the rotor core 1 and a rotor wedge 6 by an insulator 5, and is fixed by inserting the rotor wedge 6 into a coil slot opening end portion (not shown). Specifically, as illustrated in FIG. 25, the insulator 5 is inserted between the rotor core 1 and the rotor coil 4, between the rotor wedge 6 and the rotor coil 4, and, furthermore, as illustrated in FIG. 26, between a hold ring 10 and the rotor coil 4, thereby ensuring the insulation of the rotor coil 4. In addition, although not illustrated in FIG. 25, insulators are also inserted between the respective rotor coils 4.

As illustrated in FIG. 25 and FIG. 26, each sub-slot 3 is provided in the rotor core 1 and constitutes a cooling gas flow path extending in the rotor axial direction (i.e. an A direction in FIG. 26) in a radially inward side of each coil slot 2. On a rotor radially outward side of each sub-slot 3 (i.e. on an R direction side in FIG. 26), a plurality of coil airflow paths 7 (airflow paths of the rotor coils 4) extending in a rotor radial direction are provided at predetermined intervals in the rotor axial direction, in such a manner as to communicate with the sub-slot 3. On the rotor radially outward side of each coil airflow path 7, an airflow path is provided which penetrates the insulator 5 and rotor wedge 6 in a rotor radially outward direction.

By a centrifugal fan effect by the rotation of the rotor, a cooling gas F is introduced from a core end 11 into the sub-slot 3, as illustrated in FIG. 26. The cooling gas F then flows in the rotor axial direction toward the central portion in the axial direction of the rotor core 1, and branches and flows into the respective coil airflow paths 7. The cooling gas F flowing in each coil airflow path 7 cools and absorbs heat that is generated in the rotor coil 4, and is exhausted from the airflow path of the rotor wedge 6.

Various technologies have been proposed in order to improve the cooling performance for the rotor coil. However, it is difficult to sufficiently improve the cooling performance, and it is not possible to effectively cool the rotor coil.

From the above, it is desired to provide a rotor of a rotating electrical machine, which can effectively cool a rotor coil.

BRIEF DESCRIPTION OF THE DRAWINGS

FIG. 12 is a cross-sectional view illustrating a modification of the structure illustrated in FIG. 8;

FIG. 15 is a cross-sectional view illustrating a modification of the structure illustrated in FIG. 14;

FIG. 20 is a cross-sectional view illustrating a modification of the structure illustrated in FIG. 19;

DETAILED DESCRIPTION

Hereinafter, embodiments will be described with reference to the accompanying drawings.

In general, according to one embodiment, there is provided a rotor of a rotating electrical machine, the rotor including: a coil slot configured to store a rotor coil; a sub-slot configured to introduce a cooling gas from a core end portion and to pass the cooling gas toward a core central portion in a rotor axial direction; and a plurality of coil airflow paths arranged in the rotor axial direction, each of the coil airflow paths being provided in the rotor coil and configured to introduce the cooling gas flowing in the sub-slot and to pass the cooling gas toward a rotor radially outward side, such that the cooling gas flowing into the sub-slot braches and flows into the respective coil airflow paths, wherein at least one coil airflow path among the coil airflow paths comprises: a first wall surface disposed on a core central portion side of a cooling gas inlet portion of the coil airflow path; a second wall surface disposed on the core central portion side of an inside of the coil airflow path, and located more on the rotor radially outward side and more on a core end portion side than the first wall surface; and a third wall surface configured to connect the first wall surface and the second wall surface, the third wall surface including a surface perpendicular to a rotor radial direction.

First Embodiment

To begin with, a first embodiment will be described with reference to FIG. 1. Here, the above-described FIG. 24 to FIG. 26 will also be referred to.

Figure 1:
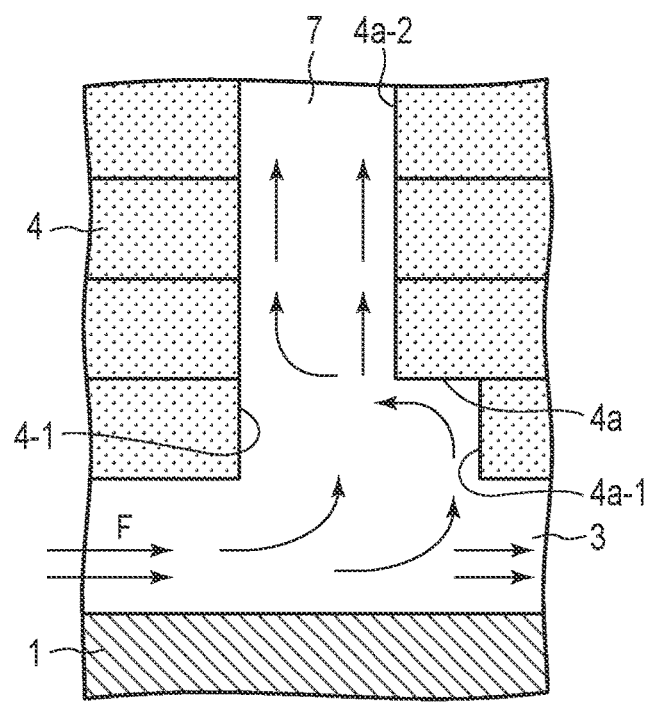
FIG. 1 is a cross-sectional view illustrating an example of a cross-sectional shape at a time when a structure including a coil airflow path, which is applied to a rotor of a rotating electrical machine according to a first embodiment, is viewed in a rotor rotational direction.

FIG. 1 is a cross-sectional view illustrating an example of a cross-sectional shape at a time when a structure including a coil airflow path, which is applied to a rotor of a rotating electrical machine according to the first embodiment, is viewed in a rotor rotational direction. Note that in FIG. 1, the common elements to FIG. 24 to FIG. 26 are denoted by like reference signs.

Figure 24:
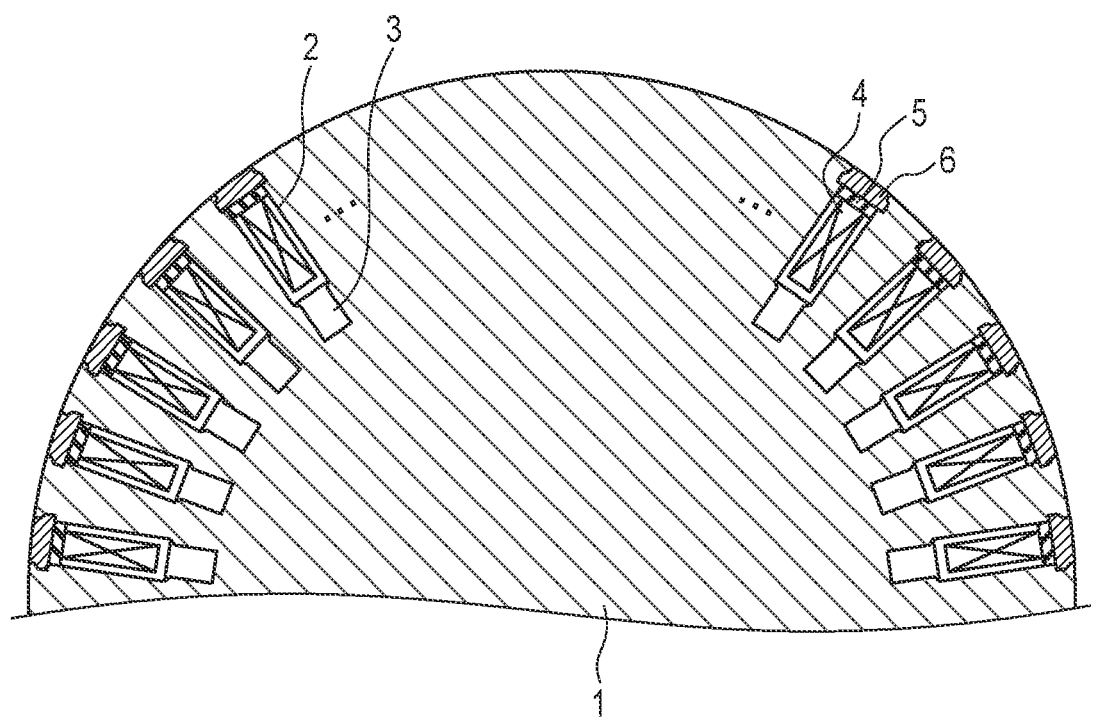
FIG. 24 is a cross-sectional view illustrating an example of a cross-sectional shape of a rotor core at a time when the rotor core is viewed in a rotor axial direction.

As also illustrated in FIG. 24, a plurality of coil slots 2 are disposed in a rotor core 1 at predetermined intervals in the circumferential direction of the rotor core 1, and a sub-slot 3 is provided on an inner peripheral side of each coil slot 2. A rotor coil 4 is stored in each coil slot 2.

Figure 25:
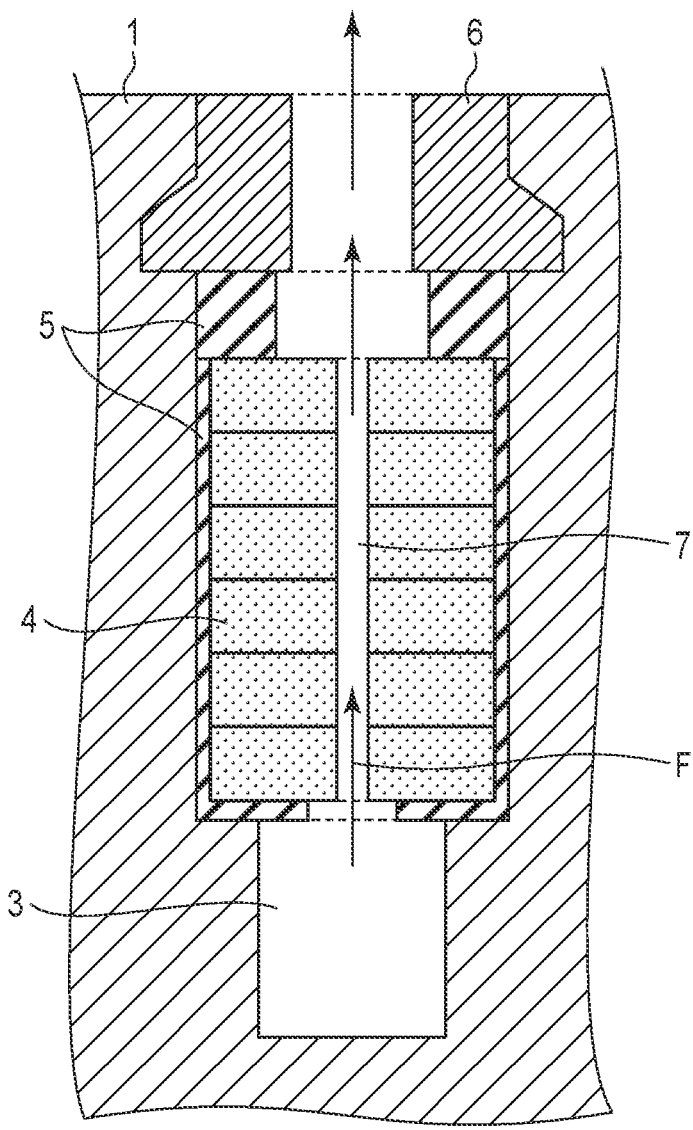
FIG. 25 is a cross-sectional view illustrating, in enlarged scale, a vicinity of a coil slot shown in FIG. 24.
Figure 26:
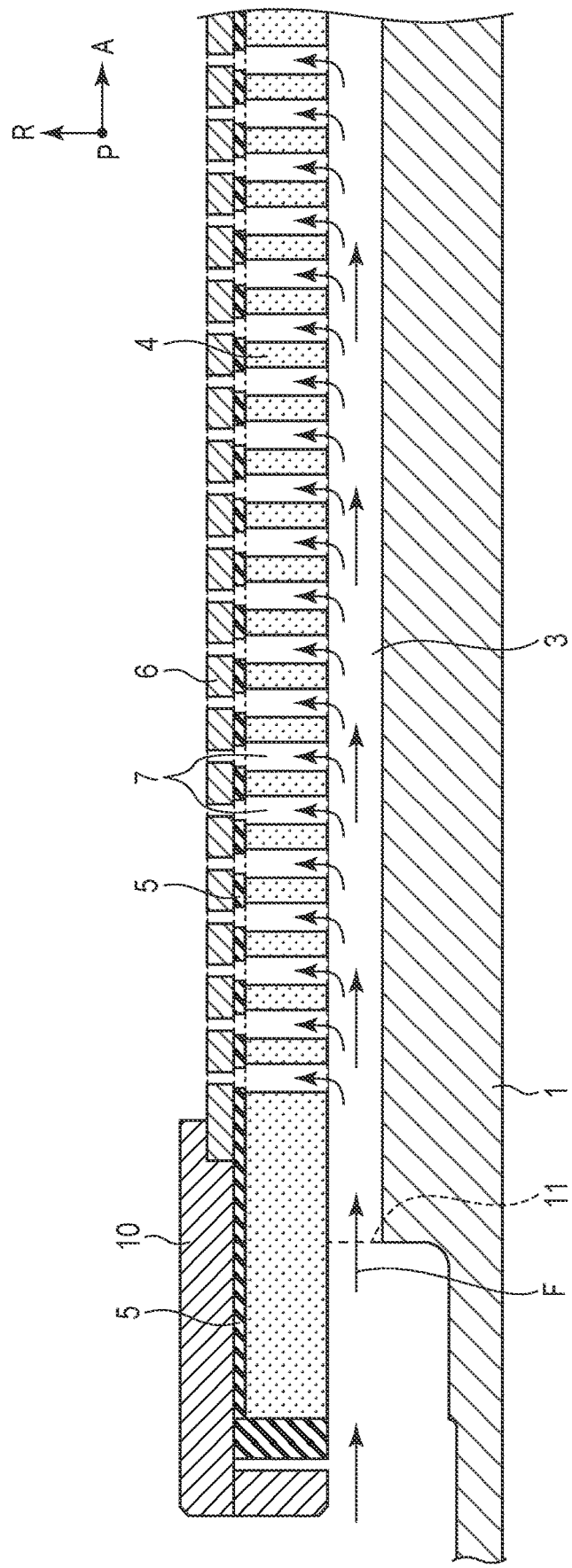
FIG. 26 is a cross-sectional view illustrating an example of a cross-sectional shape of the rotor at a time when the rotor (in a range from one core end portion to a vicinity of a core central portion) is viewed in a rotor rotational direction.

In addition, as also illustrated in FIG. 25 and FIG. 26, each sub-slot 3 is provided in the rotor core 1, and constitutes a cooling gas flow path extending in the rotor axial direction in the radially inward side of each coil slot 2. On the rotor radially outward side of each sub-slot 3, a plurality of coil airflow paths 7 extending in the rotor radial direction are provided at predetermined intervals in the rotor axial direction, in such a manner as to communicate with the sub-slot 3. On the rotor radially outward side of each coil airflow path 7, an airflow path is provided which penetrates the insulator 5 and rotor wedge 6 in the rotor radially outward direction.

By a centrifugal fan effect by the rotation of the rotor, a cooling gas F is introduced from a core end 11 into the sub-slot 3, as illustrated in. FIG. 26. The cooling gas F then flows in the rotor axial direction toward the central portion in the axial direction of the rotor core 1, and branches and flows into the respective coil airflow paths 7. In each coil airflow path 7, as illustrated in FIG. 1, the cooling gas F flows into the coil airflow path 7 from the sub-slot 3, and passes through the coil airflow path 7 while cooling the coil airflow path 7.

The basic structure of the rotor of the rotating electrical machine according to the first embodiment is similar to the basic structure illustrated in FIG. 24 to FIG. 26, but is different with respect to the shape or the like of the coil airflow path 7 in the rotor coil 4.

In the present embodiment, among the coil airflow paths 7 arranged in the rotor axial direction, at least one coil airflow path 7 includes a wall surface 4a-1 (first wall surface) disposed on a core central portion side of a cooling gas inlet portion of the coil airflow path 7; a wall surface 4a-2 (second wall surface) disposed on the core central portion side of an inside of the coil airflow path 7, and located more on the rotor radially outward side and more on a core end portion side than the wall surface 4a-l; and a wall surface 4a (third wall surface) which connects the wall surface 4a-1 and the wall surface 4a-2 and includes a surface perpendicular to the rotor radial direction.

In this manner, since the wall surface 4a is present between the wall surface 4a-1 and the wall surface 4a-2, a stepped portion is formed between the wall surface 4a-1 and the wall surface 4a-2, and a flow path width (or a flow path area) of the coil airflow path 7 is smaller in the inside of the coil airflow path 7 than in the inlet portion of the coil airflow path 7.

On the other hand, on the core end portion side of the coil airflow path 7, there is provided no wall surface like the wall surface 4a which includes a surface perpendicular to the rotor radial direction. On the core end portion side of the coil airflow path 7, there is provided a wall surface 4-1 which constitutes one surface that is continuous in the rotor radial direction from the cooling gas inlet portion of the coil airflow path 7 to the inside of the coil airflow path 7. However, the embodiment is not limited to this example.

Note that the wall surface 4a may be formed by properly varying the length in the rotor axial direction of each layer of the multilayered rotor coil 4, or may be formed by processing one layer of the rotor coil 4 in a desired shape.

In addition, the height of the wall surface 4a in the rotor radial direction does not need to be set to be equal among different coil airflow paths 7, or not need to be set to be uniform in one coil airflow path 7. A plurality of parts with different heights may be formed as appropriate. The same applies to the length of the wall surface 4a in the rotor axial direction.

Furthermore, in the coil airflow path 7, it is conceivable that the wall surface 4a including the surface perpendicular to the rotor radial direction is provided not on the core central portion side, but on the core end portion side. However, in particular, in the coil airflow path 7 near the core end, the cooling gas F drifts toward the core central portion side, it is preferable that the wall surface 4a is formed on the core central portion side, as in the example of FIG. 1, from the standpoint of shutting off the drift current.

In the above-described structure, if the cooling gas F flows from the sub-slot 3 into the cooling gas inlet portion of the coil airflow path 7, part of the cooling gas F impinges on the wall surface 4a and the direction of flow of the cooling gas F is forcibly changed by the wall surface 4a. Since the cooling gas F, whose direction of flow is changed by the wall surface 4a, further runs against the other part of the cooling gas F in the coil airflow path 7, the generation of turbulent flow is promoted. The cooling gas F, the generation of turbulent flow of which is promoted, flows in the rotor radial direction while cooling the rotor coil 4 in the inside of the coil airflow path 7. At this time, the temperature of the cooling gas becomes closer to a uniform state by advection, and the temperature of the cooling gas F in the vicinity of the wall surface of the coil airflow path becomes lower than when the action of turbulent flow is absent. Since the heat removing performance of removing heat from an individual body by the coolant is proportional to a temperature difference near the interface, the heat removing performance is improved.

According to the first embodiment, the turbulent flow promotion effect of the cooling gas F in the coil airflow path 7 can be obtained, in particular, in the coil airflow path 7 near the core end portion, and the cooling performance can be improved.

Second Embodiment

Next, referring to FIG. 2 to FIG. 6, a second embodiment will be described. Hereinafter, a description of parts common to the first embodiment will be omitted, and different parts will be mainly described.

Figure 2:
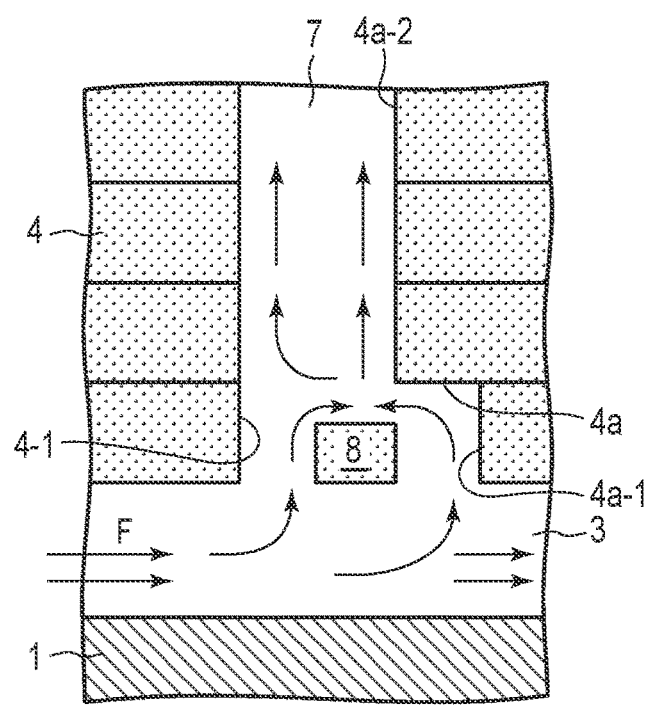
FIG. 2 is a cross-sectional view illustrating an example of a cross-sectional shape at a time when a structure including a coil airflow path, which is applied to a rotor of a rotating electrical machine according to a second embodiment, is viewed in a rotor rotational direction.

FIG. 2 is a cross-sectional view illustrating an example of a cross-sectional shape at a time when a structure including a coil airflow path, which is applied to a rotor of a rotating electrical machine according to the second embodiment, is viewed in a rotor rotational direction. Note that in FIG. 2, the common elements to FIG. 1 are denoted by like reference signs.

In the present embodiment, among the coil airflow paths 7 arranged in the rotor axial direction, at least one coil airflow path 7 is configured such that the cooling gas inlet portion of the coil airflow path 7 is divided into a plurality of portions by a structural object 8 (first structural object). Specifically, at least one coil airflow path 7 is configured to cause part of the cooling gas F flowing in the sub-slot 3 to flow into a plurality of flow paths (two flow paths in this example), which are divided by the structural object 8 disposed between the wall surface 4-1 and wall surface 4a-1, in the cooling gas inlet portion of the coil airflow path 7, and to make flows of the cooling gas F passing through these flow paths confluent in the coil airflow path 7.

The number of flow paths divided by the structural object 8 may be two, or may be three or more. In addition, the structural object 8 may be a part of the coil 4, or may be a member other than the coil 4. Further, the thickness of the structural object 8 in the rotor radial direction may be made to agree with the thickness of the rotor coil 4 in the rotor radial direction from the standpoint of workability, or may not be made to agree with the thickness of the rotor coil 4 in the rotor radial direction from the standpoint of cooling performance. Besides, the shape of the structural object 8 may be a simple shape having a right angle from the standpoint of workability, or may be one of an acute-angled shape, an obtuse-angled shape and an arcuate shape from the standpoint of cooling performance.

In this structure, when the cooling gas F flows from the sub-slot 3 into the cooling gas inlet portion of the coil airflow path 7, the cooling gas F flows into a plurality of flow paths (a flow path on the core end portion side and a flow path on the core central portion side) divided by the structural object 8. The cooling gas F flowing in the flow path on the core central portion side impinges on the wall surface 4a and changes the direction of flow thereof, and further runs against, and becomes confluent with, the cooling gas F flowing in the flow path on the core end portion side, and then flows toward the flow path on the rotor radially outward side.

In this manner, since the impingement of the cooling gas F occurs more frequently, the turbulent flow promotion effect of the cooling gas F in the coil airflow path 7 is further improved, and the cooling performance for the coil 4 is further improved.

In the example of FIG. 2, the case is illustrated in which, on the core end portion side of the coil airflow path 7, there is provided no wall surface like the wall surface 4a which includes a surface perpendicular to the rotor radial direction. However, the embodiment is not limited to this example.

Figure 3:
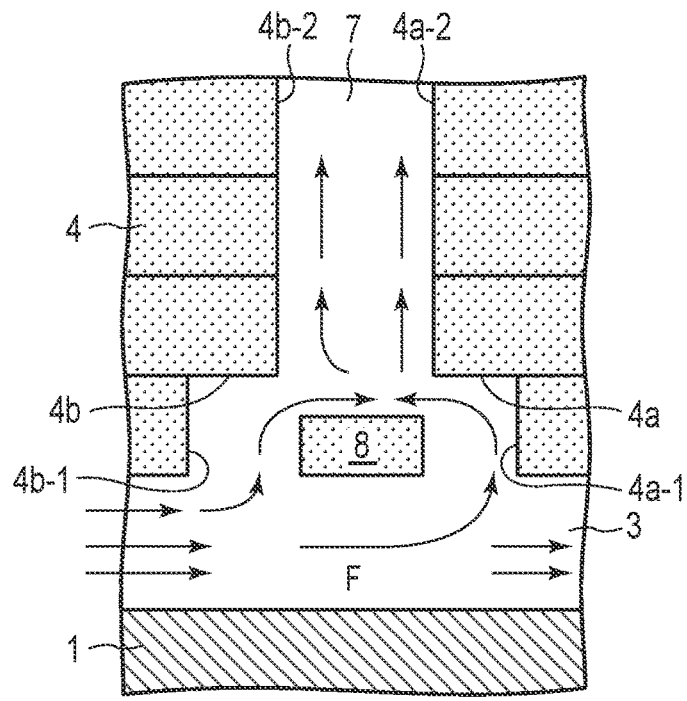
FIG. 3 is a cross-sectional view illustrating a modification of the structure illustrated in FIG. 2.

For example, as illustrated in FIG. 3, the coil airflow path 7 may include a wall surface 4b-1 (fourth wall surface) disposed on the core end portion side of the cooling gas inlet portion of the coil airflow path 7; a wall surface 4b-2 (fifth wall surface) disposed on the core end portion side of the inside of the coil airflow path 7, and located more on the rotor radially outward side and more on the core central portion side than the wall surface 4b-1; and a wall surface 4b (sixth wall surface) which connects the wall surface 4b-1 and the wall surface 4b-2 and includes a surface perpendicular to the rotor radial direction.

With this structure, since the turbulent flow action by the impingement of the cooling gas F on the wall surface 4b is added, the turbulent flow promotion effect of the cooling gas F in the coil airflow path 7 is further improved, and the cooling performance for the coil 4 is further improved.

In the example of FIG. 3, although the case is illustrated in which the height of the wall surface 4a in the rotor radial direction and the height of the wall surface 4b in the rotor radial direction are equal, the embodiment is not limited to this example. The height of the wall surface 4a in the rotor radial direction and the height of the wall surface 4b in the rotor radial direction may be set to be different. For example, as illustrated in FIG. 4, the wall surface 4a may be formed more outward in the rotor radial direction than the wall surface 4b.

Figure 4:
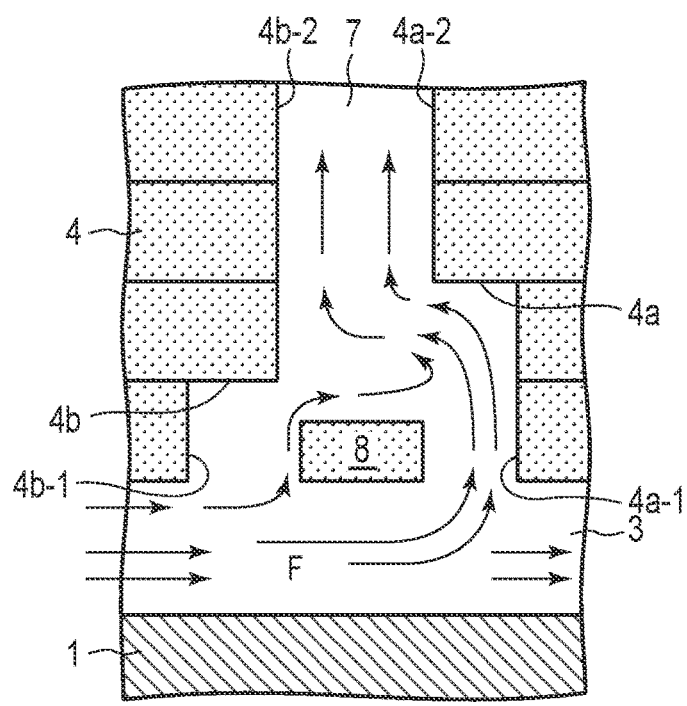
FIG. 4 is a cross-sectional view illustrating a modification of the structure illustrated in FIG. 3.

In addition, in the examples of FIG. 2 to FIG. 4, the case is illustrated in which the flow paths divided by the structural object 8 are arranged in the rotor axial direction, but the embodiment is not limited to these examples. For example, the flow paths divided by the structural object 8 may be arranged in the rotor rotational direction. A concrete example of this case will be described with reference to FIG. 5 and FIG. 6.

Figure 5:
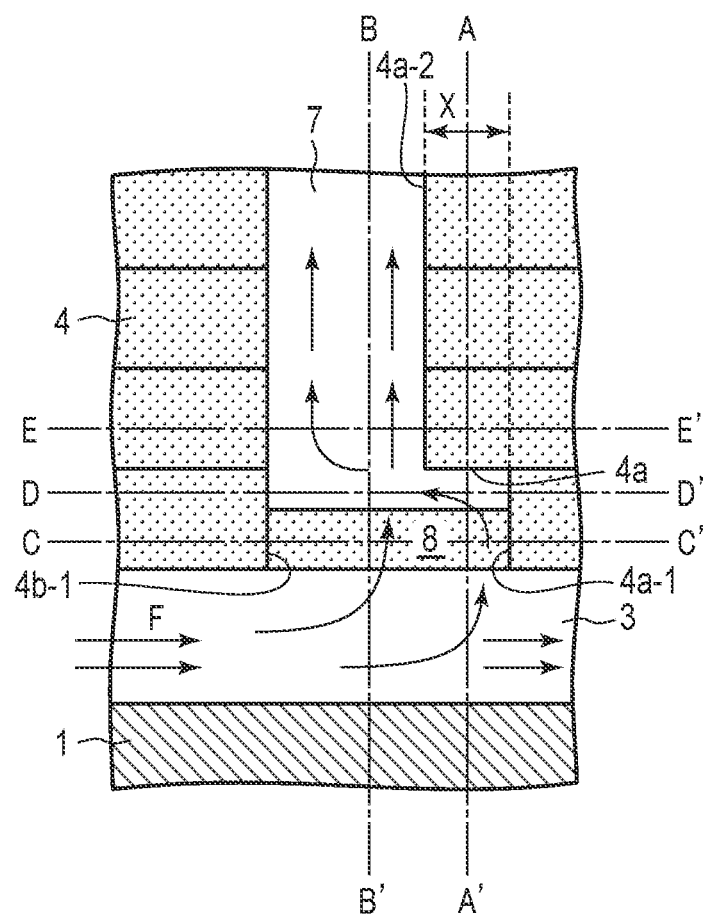
FIG. 5 is a cross-sectional view illustrating a modification of the structure illustrated in FIG. 2.

FIG. 5 is a cross-sectional view illustrating a modification of the structure illustrated in FIG. 2. In addition, FIG. 6 is cross-sectional views illustrating examples of cross-sectional shapes of an A-A' cross section and a B-B' cross section in FIG. 5 (cross-sectional shapes as viewed in the rotor axial direction), and cross-sectional shapes of a C-C' cross section, a D-D' cross section and an E-E' cross section in FIG. 5 (cross-sectional shapes as viewed in the rotor radial direction).

Figure 6:
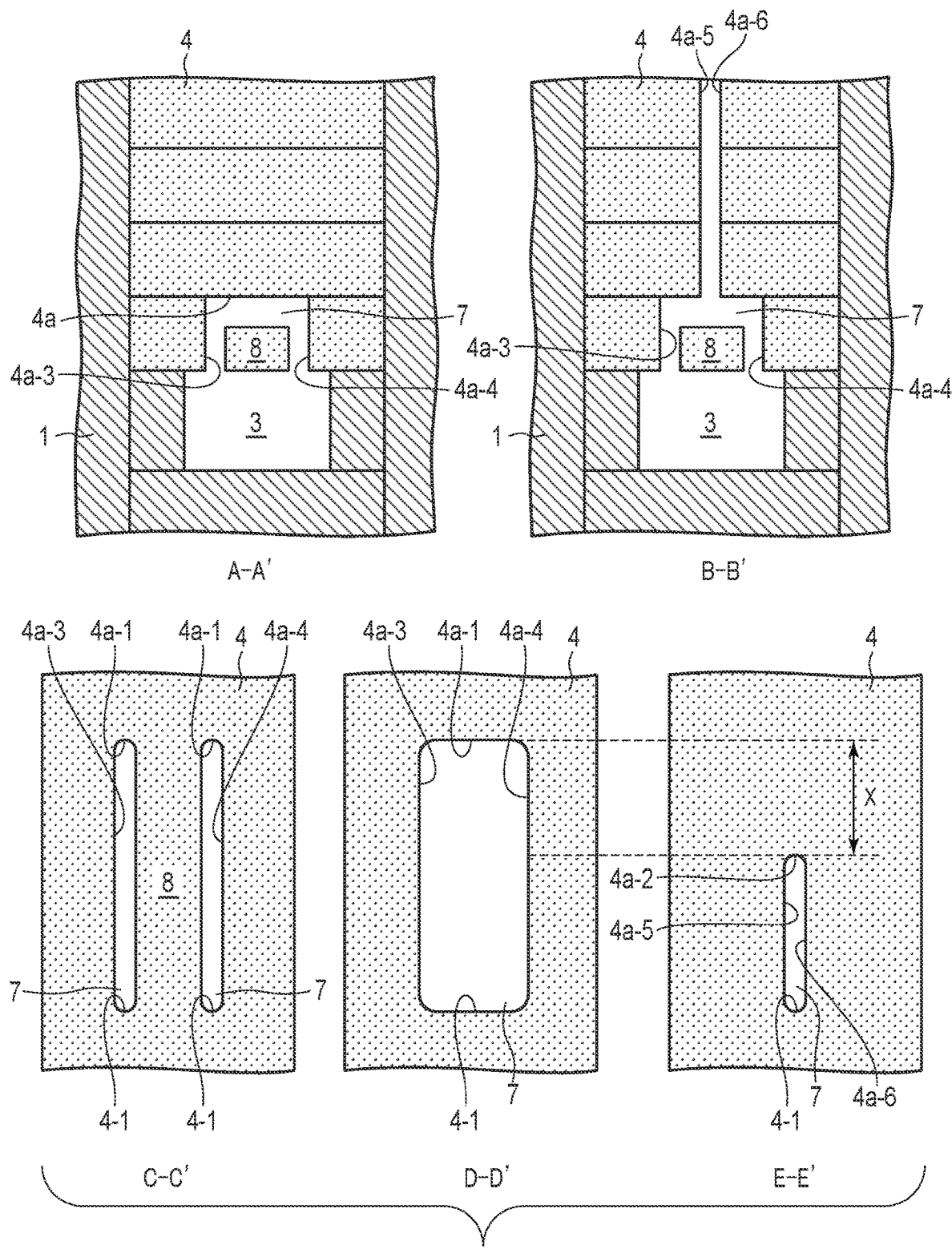
FIG. 6 is cross-sectional views illustrating examples of cross-sectional shapes of an A-A' cross section and a B-B' cross section in FIG. 5 (cross-sectional shapes as viewed in a rotor axial direction), and cross-sectional shapes of a C-C' cross section, a D-D' cross section and an E-E' cross section in FIG. 5 (cross-sectional shapes as viewed in a rotor radial direction)

A structural object 8 illustrated in FIG. 5 is disposed in such a manner as to form a plurality of flow paths (two flow paths in this example) which are arranged in the rotor rotational direction between a wall surface 4a-3 and a wall surface 4a-4, as illustrated in the A-A' cross section and B-B' cross section of FIG. 6. In addition, as illustrated in the B-B' cross section of FIG. 6, a flow path, which is located more on the rotor radially outward side than the position of the wall surface 4a, is narrowed by a wall surface 4a-5 and a wall surface 4a-6.

The coil airflow path 7 is configured to cause part of the cooling gas F flowing in the sub-slot 3 to flow into the flow paths, which are divided by the structural object 8 as illustrated in the C-C' cross section of FIG. 6, in the cooling gas inlet portion of the coil airflow path 7, and to make flows of the cooling gas F passing through these flow paths confluent in a flow path illustrated in the D-D' cross section of FIG. 6. In addition, as illustrated in the E-E' cross section of FIG. 6, more on a rotor radially outward side than the flow path illustrated in the D-D' cross section, there is provided a flow path whose width in the rotor axial direction is decreased by a length x corresponding to the length of the wall surface 4a, i.e. a flow path which is narrowed by the above-described wall surface 4a-5 and wall surface 4a-6.

In this structure, when the cooling gas F flows from the sub-slot 3 into the cooling gas inlet portion of the coil airflow path 7, the cooling gas F flows into the flow paths divided by the structural object 8. The cooling gas F flowing in the flow path on the core central portion side impinges on wall surfaces such as the wall surface 4a and further runs against, and becomes confluent with, the other cooling gas F, and then flows toward the flow path narrowed by the wall surface 4a-5 and wall surface 4a-6 on the rotor radially outward side.

With this structure, since the impingement of the cooling gas F occurs more frequently, the turbulent flow promotion effect of the cooling gas F in the coil airflow path 7 is further improved, and the cooling performance for the coil 4 is further improved.

According to the second embodiment, by the disposition of the structural object 8, the turbulent flow promotion effect of the cooling gas F in the coil airflow path 7 can be further improved and the cooling performance can be further improved.

Third Embodiment

Next, referring to FIG. 7 to FIG. 12, a third embodiment will be described. Hereinafter, a description of parts common to the second embodiment will be omitted, and different parts will be mainly described.

Figure 7:
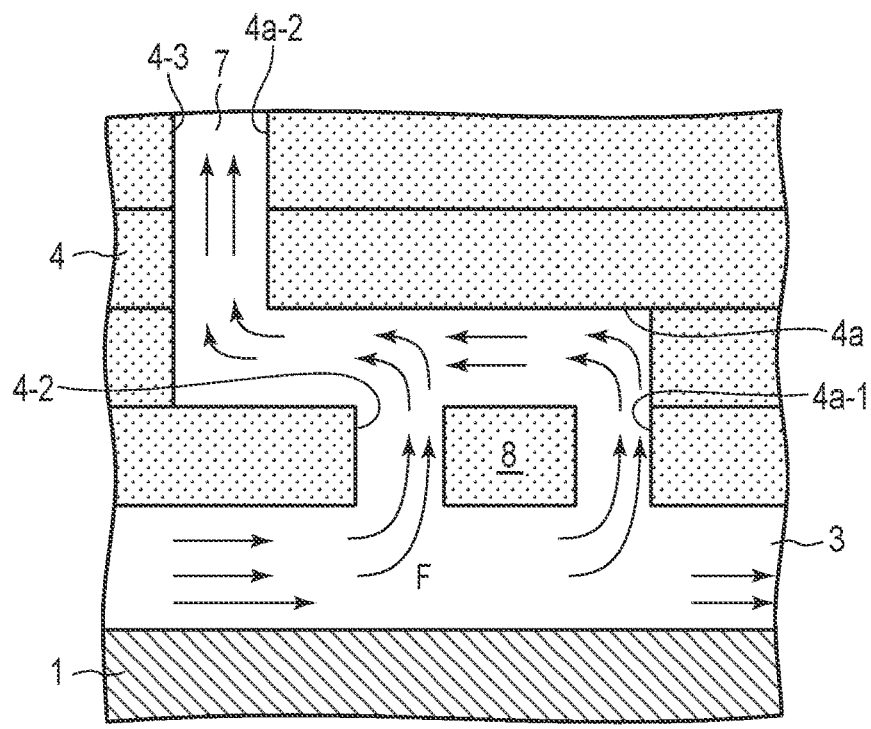
FIG. 7 is a cross-sectional view illustrating an example of a cross-sectional shape at a time when a structure including a coil airflow path, which is applied to a rotor of a rotating electrical machine according to a third embodiment, is viewed in a rotor rotational direction.

FIG. 7 is a cross-sectional view illustrating an example of a cross-sectional shape at a time when a structure including a coil airflow path, which is applied to a rotor of a rotating electrical machine according to the third embodiment, is viewed in a rotor rotational direction. Note that in FIG. 7, the common elements to FIG. 2 are denoted by like reference signs.

In the present embodiment, among the coil airflow paths 7 arranged in the rotor axial direction, at least one coil airflow path 7 is configured such that the wall surface 4a-2, which is located on the core central portion side of the inside of the coil airflow path 7, is located more on the core end portion side than a wall surface 4-2 which is located on the core end portion side of the cooling gas inlet portion of the coil airflow path 7.

In this structure, when the cooling gas F flows from the sub-slot 3 into the cooling gas inlet portion of the coil airflow path 7, the cooling gas F flows into a plurality of flow paths (a flow path on the core end portion side and a flow path on the core central portion side) divided by the structural object 8. The cooling gas F flowing in the flow path on the core end portion side impinges on the wall surface 4a. On the other hand, the cooling gas F flowing in the flow path on the core central portion side also impinges on the wall surface 4a. The cooling gas F, which flows in the flow path on the core central portion side and impinges on the wall surface 4a, advances toward the core end portion side along the wall surface 4a, and further runs against, and becomes confluent with, the cooling gas F flowing into the flow path on the core end portion side. The confluent cooling gas F further advances toward the core end portion side along the wall surface 4a, impinges on a wall surface 4-3 and flows toward a flow path between the wall surface 4-3 and wall surface 4a-2.

With this structure, both of the flows of the cooling gas F flowing into the flow paths divided by the structural object 8 impinge on the wall surface 4a. Thus, the turbulent flow promotion effect of the cooling gas F in the coil airflow path 7 is further improved, and the cooling performance for the coil 4 is further improved.

Figure 8:
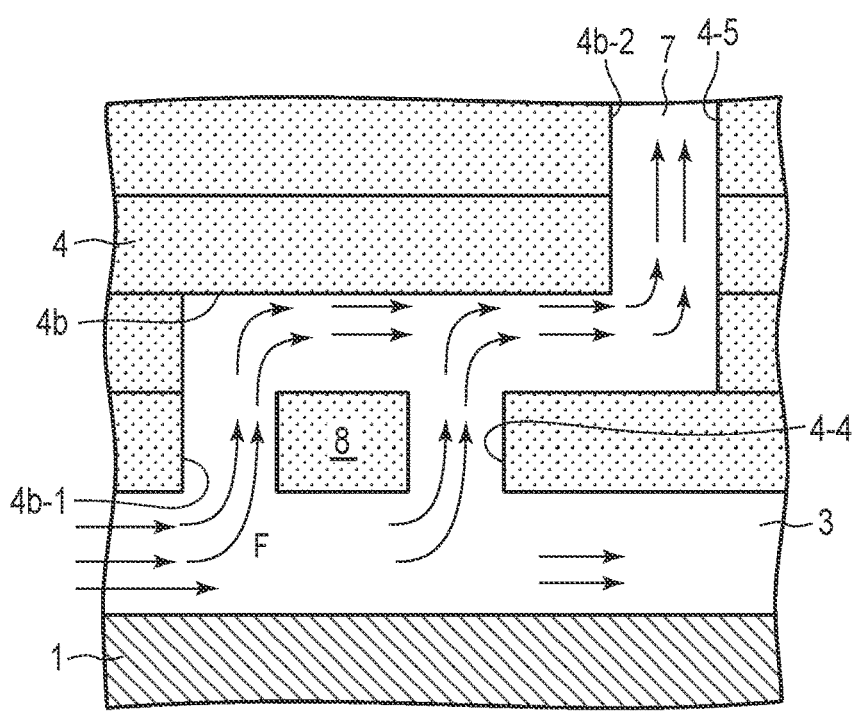
FIG. 8 is a cross-sectional view illustrating a modification of the structure illustrated in FIG. 7.

In the example of FIG. 7, the case is illustrated in which the cooling gas F that is made confluent in the coil airflow path 7 advances toward the core end portion side. However, the embodiment is not limited to this example. For example, it is possible to adopt such a configuration that the cooling gas F that is made confluent in the coil airflow path 7 advances toward the core central portion side. FIG. 8 illustrates an example of this case.

FIG. 8 is a cross-sectional view illustrating a modification of the structure illustrated in FIG. 7.

As illustrated in FIG. 8, the coil airflow path 7 is configured such that the wall surface 4b-2, which is located on the core end portion side of the inside of the coil airflow path 7, is located more on the core central portion side than a wall surface 4-4 which is located on the core central portion side of the cooling gas inlet portion of the coil airflow path 7.

In this structure, when the cooling gas F flows from the sub-slot 3 into the cooling gas inlet portion of the coil airflow path 7, the cooling gas F flows into a plurality of flow paths (a flow path on the core end portion side and a flow path on the core central portion side) divided by the structural object 8. The cooling gas F flowing in the flow path on the core end portion side impinges on the wall surface 4b. On the other hand, the cooling gas F flowing in the flow path on the core central portion side also impinges on the wall surface 4b. The cooling gas F, which flows in the flow path on the core end portion side and impinges on the wall surface 4b, advances toward the core central portion side along the wall surface 4b, and further runs against, and becomes confluent with, the cooling gas F flowing into the flow path on the core central portion side. The confluent cooling gas F further advances toward the core central portion side along the wall surface 4b, impinges on a wall surface 4-5 and flows toward a flow path between the wall surface 4b-2 and wall surface 4-5.

In this manner, both of the flows of the cooling gas F flowing into the flow paths divided by the structural object 8 impinge on the wall surface 4b. Thus, the turbulent flow promotion effect of the cooling gas F in the coil airflow path 7 is further improved, and the cooling performance for the coil 4 is further improved.

Furthermore, both of the coil airflow path 7 illustrated in FIG. 7 and the coil airflow path 7 illustrated in FIG. 8 may be applied to the rotor. For example, such a structure may be adopted that the coil airflow path 7 illustrated in FIG. 7 and the coil airflow path 7 illustrated in FIG. 8 are alternately arranged in the rotor rotational direction. In this case, since the variance among coil temperatures in the axial direction can be decreased, the cooling performance for the coil 4 can be improved.

In the examples of FIG. 7 to FIG. 8, the case is illustrated in which the flow paths divided by the structural object 8 are arranged in the rotor axial direction, but the embodiment is not limited to these examples. For example, the flow paths divided by the structural object 8 may be arranged in the rotor rotational direction. A concrete example of this case will be described with reference to FIG. 9 and FIG. 10.

Figure 9:
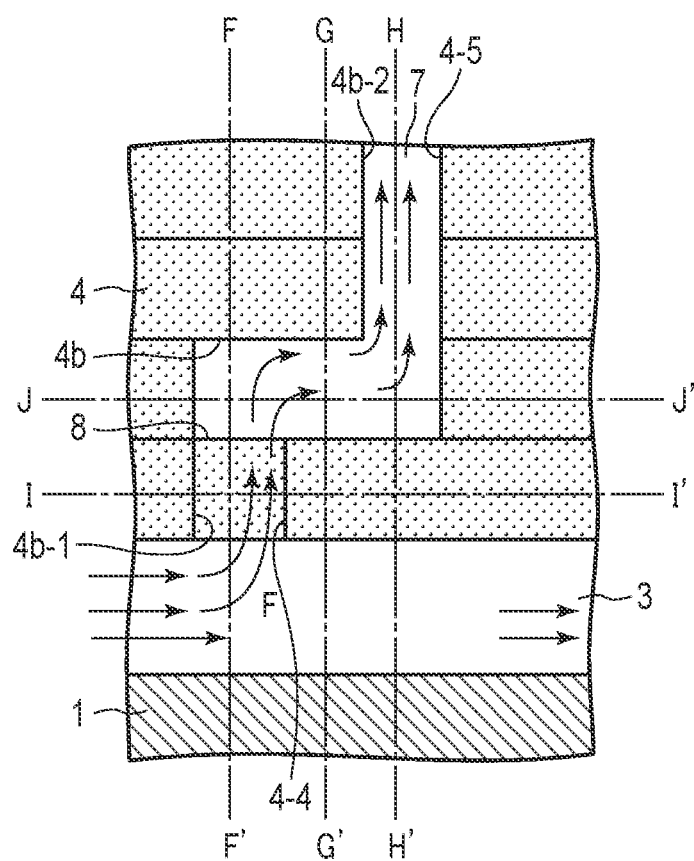
FIG. 9 is a cross-sectional view illustrating a modification of the structure illustrated in FIG. 8.

FIG. 9 is a cross-sectional view illustrating a modification of the structure illustrated in FIG. 8. In addition, FIG. 10 is cross-sectional views illustrating examples of cross-sectional shapes of an F-F' cross section, a G-G' cross section and an H-H' cross section in FIG. 9 (cross-sectional shapes as viewed in the rotor axial direction), and cross-sectional shapes of an I-I' cross section and a J-J' cross section in FIG. 9 (cross-sectional shapes as viewed in the rotor radial direction).

Figure 10:
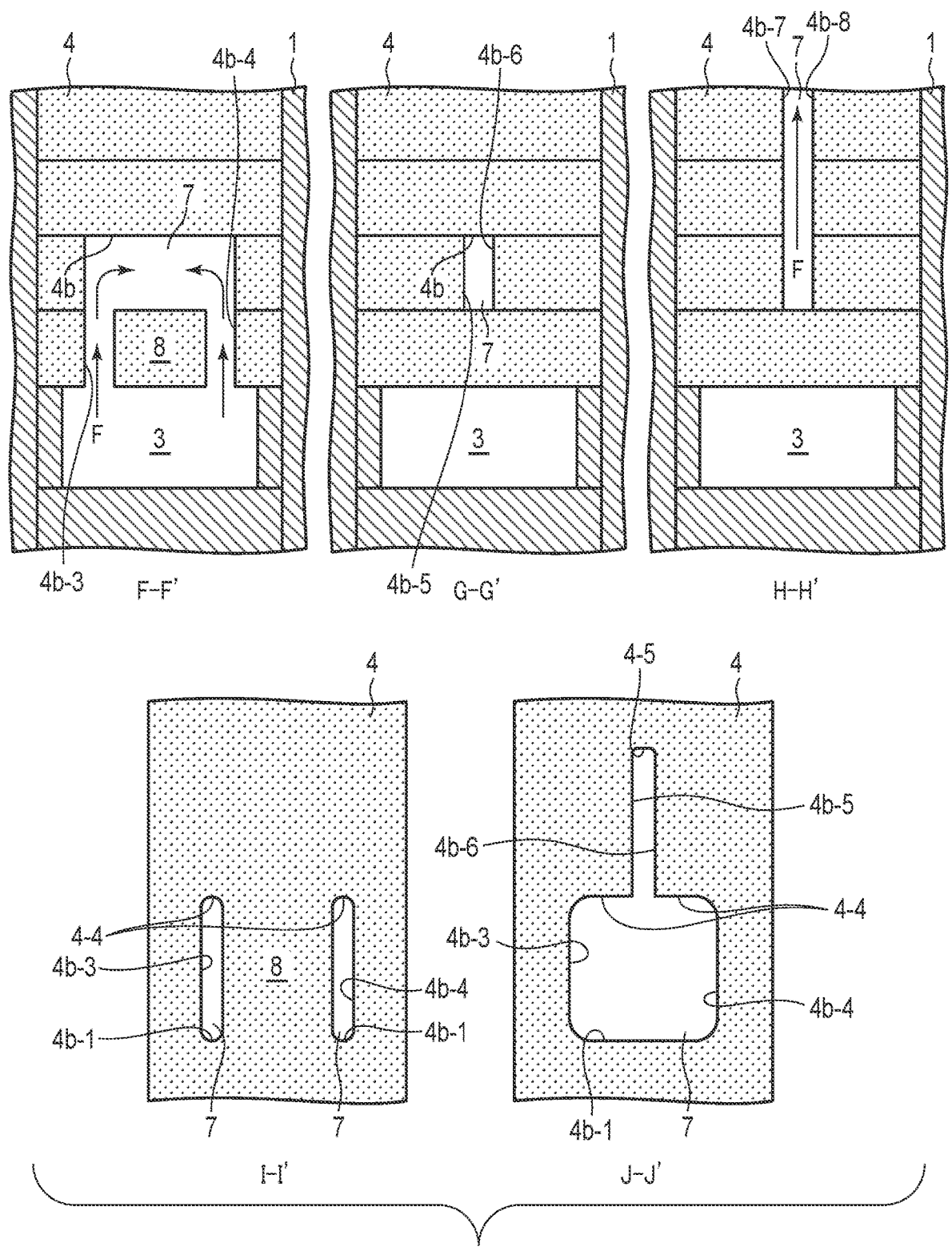
FIG. 10 is cross-sectional views illustrating examples of cross-sectional shapes of an F-F' cross section, a G-G' cross section and an H-H' cross section in FIG. 9 (cross-sectional shapes as viewed in the rotor axial direction), and cross-sectional shapes of an I-I' cross section and a J-J' cross section in FIG. 9 (cross-sectional shapes as viewed in the rotor radial direction)

A structural object 8 illustrated in FIG. 9 is disposed in such a manner as to form a plurality of flow paths (two flow paths in this example) which are arranged in the rotor rotational direction between a wall surface 4b-3 and a wall surface 4b-4, as illustrated in the F-F' cross section of FIG. 10. In addition, as illustrated in the G-G' cross section of FIG. 10, a flow path, which extends from an upper space of the structural object 8 toward the rotor central portion side, is narrowed by a wall surface 4b-5 and a wall surface 4b-6. Moreover, as illustrated in the H-H' cross section of FIG. 10, a flow path, which extends toward the rotor radially outward side, is narrowed by a wall surface 4b-7 and a wall surface 4b-8.

The coil airflow path 7 is configured to cause part of the cooling gas F flowing in the sub-slot 3 to flow into the flow paths, which are divided by the structural object 8 as illustrated in the I-I' cross section of FIG. 10, in the cooling gas inlet portion of the coil airflow path 7, and to make flows of the cooling gas F passing through these flow paths confluent in a flow path which is illustrated in the J-J' cross section of FIG. 10 and is surrounded by the wall surface 4b-3, wall surface 4b-4, wall surface 4b-1 and wall surface 4-4. On the rotor central portion side of the space in which the gas flows become confluent, there is provided a flow path whose width in the rotor rotational direction is decreased, i.e. a flow path which is narrowed by the above-described wall surface 4b-5 and wall surface 4b-6.

In this structure, when the cooling gas F flows from the sub-slot 3 into the cooling gas inlet portion of the coil airflow path 7, the cooling gas F flows into the flow paths divided by the structural object 8. The respective incoming flows of the cooling gas F impinge on the wall surface 4b and become confluent, and further impinge on the wall surface 4-4. Then, the confluent cooling gas F passes through the flow path which is located on the rotor radially outward side and narrowed by the wall surface 4b-5 and wall surface 4b-6, impinges on the wall surface 4-5, and flows toward the flow path which is located on the rotor radially outward side and narrowed by the wall surface 4b-7 and wall surface 4b-8.

Also when the coil airflow path 7 is formed in this manner, since the impingement of the cooling gas F occurs more frequently, the turbulent flow promotion effect of the cooling gas F in the coil airflow path 7 is further improved, and the cooling performance for the coil 4 is further improved.

Figure 11:
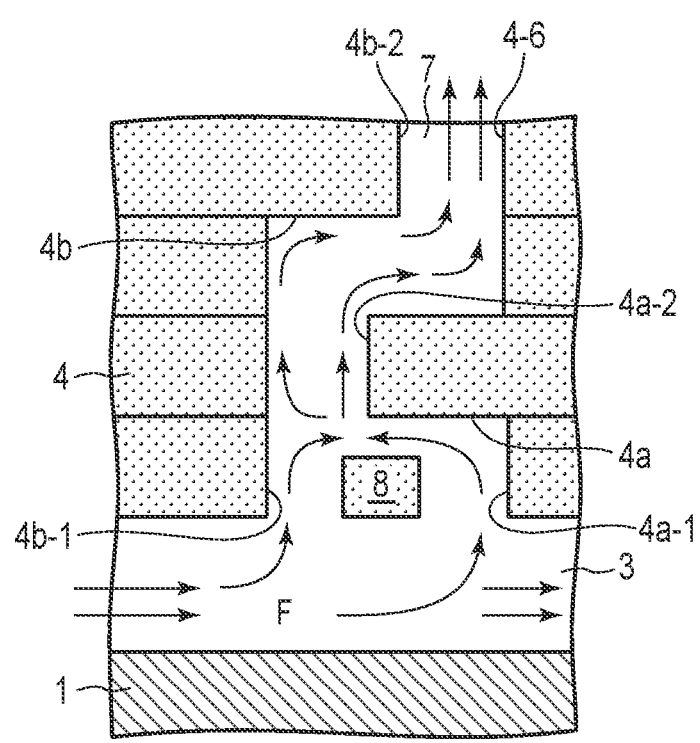
FIG. 11 is a cross-sectional view illustrating a modification of the structure illustrated in FIG. 8.

Besides, a modification illustrated in FIG. 11 and a modification illustrated in FIG. 12 may be adopted.

In the modification illustrated in FIG. 11, the coil airflow path 7 includes a wall surface 4a on which the cooling gas F flowing into the flow path on the core central portion side of the structural object 8 impinges; a wall surface 4b on which the cooling gas F made confluent in the coil airflow path 7 impinges after flowing toward the rotor radially outward side between the wall surface 4b-1 and wall surface 4a-2; and a core wall surface 4-6 on which the cooling gas F impinges after flowing toward the core central portion side along the wall surface 4b.

In addition, in the modification illustrated in FIG. 12, the coil airflow path 7 includes a wall surface 4b on which the flows of the cooling gas F flowing into the two flow paths divided by the structural object 8 impinge; a wall surface 4c-1 on which the cooling gas F made confluent in the coil airflow path 7 impinges after flowing toward the core central portion side along the wall surface 4b; a wall surface 4c on which the cooling gas F impinges after flowing toward the rotor radially outward side between the wall surface 4b-2 and wall surface 4c-1; a wall surface 4d-1 on which the cooling gas F impinges after flowing toward the core end portion side along the wall surface 4c; a wall surface 4d on which the cooling gas F impinges after flowing toward the rotor radially outward side between the wall surface 4d-1 and a wall surface 4c-2; and a wall surface 4-7 on which the cooling gas F impinges after flowing toward the core central portion side along the wall surface 4d.

With this structure, since the impingement of the cooling gas F occurs more frequently, the turbulent flow promotion effect of the cooling gas F in the coil airflow path 7 is further improved. Moreover, since the coils 4 are uniformly cooled in the rotor axial direction, the variance among coil temperatures in the rotor axial direction is small, and the cooling performance for the coil 4 is further improved.

According to the third embodiment, since a greater number of turbulence actions of the cooling gas F can be obtained, a high cooling performance can be achieved even in the coil airflow path 7 on the core central portion side, on which the flow rate in the sub-slot 3 is low and a drift of the flow after branching is small.

In the above-described second and third embodiments, the case is illustrated in which the coil airflow path 7 includes the structural object 8 (first structural object), which divides the flow path into a plurality of flow paths, in the cooling gas inlet portion. Additionally, the coil airflow path 7 may be configured to include another structural object 9 (second structural object), which further divides the flow path, also in the inside of the coil airflow path 7. Even when the turbulence action is obtained by the first structural object or the like, the turbulence is eliminated if the cooling gas F moves over a predetermined distance or more relative to the equivalent diameter of the flow path. However, by providing the second structural object in the inside of the coil airflow path 7, the turbulence action is obtained once again. A concrete example of this case will be described in the following embodiment.

Fourth Embodiment

Next, a fourth embodiment will be described with reference to FIG. 13 to FIG. 17. Hereinafter, a description of parts common to the second and third embodiments will be omitted, and different parts will be mainly described.

Figure 13:
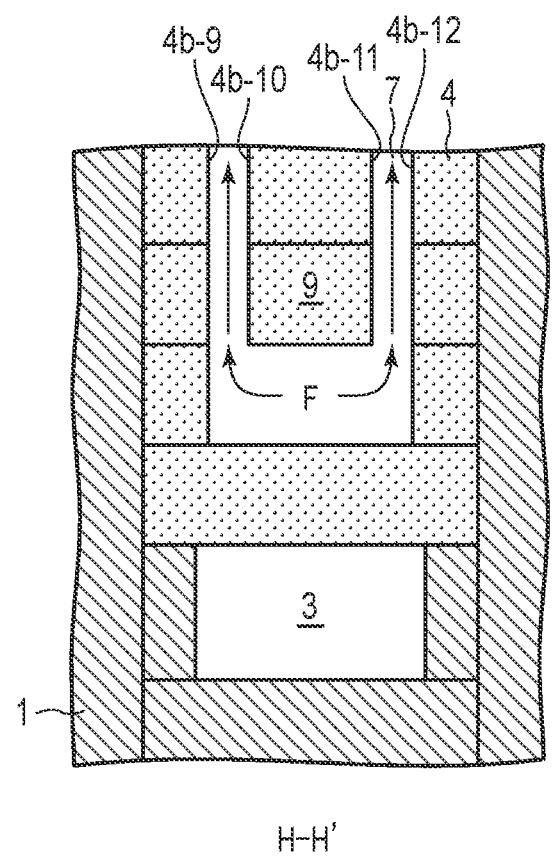
FIG. 13 is a cross-sectional view illustrating an example of a cross-sectional shape at a time when a structure including a coil airflow path, which is applied to a rotor of a rotating electrical machine according to a fourth embodiment, is viewed in a rotor rotational direction (a cross-sectional view illustrating a modification of the structure illustrated in FIG. 9 (a modification of the cross-sectional shape of the H-H' cross section))

FIG. 13 is a cross-sectional view illustrating a modification of the structure illustrated in FIG. 9 (a modification of the cross-sectional shape of the H-H' cross section). The shape of the H-H' cross section illustrated in FIG. 13 is different from the shape of the H-H' cross section illustrated in FIG. 10.

In the present embodiment, among the coil airflow paths 7 arranged in the rotor axial direction, at least one coil airflow path 7 is configured to cause the cooling gas F, which passes through the flow paths (two flow paths in this example) divided by the structural object 8 and become confluent, to further flow into a plurality of flow paths (two flow paths in this example) which are divided by a structural object 9 disposed between a wall surface 4b-9 and a wall surface 4b-12 in the inside of the coil airflow path 7.

Note that the number of flow paths divided by the structural object 9 may be two, or may be three or more. In addition, a plurality of structural objects 9 may be provided such that the structural objects 9 are spaced apart in the rotor radial direction. Further, the structural object 8 may be a part of the coil 4, or may be a member other than the coil 4. Moreover, the thickness of the structural object 9 in the rotor radial direction may be made to agree with the thickness of the rotor coil 4 in the rotor radial direction from the standpoint of workability, or may not be made to agree with the thickness of the rotor coil 4 in the rotor radial direction from the standpoint of cooling performance. Besides, the shape of the structural object 8 may be a simple shape having a right angle from the standpoint of workability, or may be one of an acute-angled shape, an obtuse-angled shape and an arcuate shape from the standpoint of cooling performance.

In this structure, when the cooling gas F, which passes through the flow paths (two flow paths in this example) divided by the structural object 8 and become confluent, enters the space between the wall surface 4b-9 and wall surface 4b-12, the cooling gas F advances toward the rotor radially outward side, impinges on the structural object 9, and inflows into a plurality of flow paths divided by the structural object 9, i.e. a flow path between the wall surface 4b-9 and a wall surface 4b-10 and a flow path between a wall surface 4b-11 and the wall surface 4b-12.

With this structure, since a new turbulent flow can be generated by the structural object 9 before the turbulent flow generated by the structural object 8 disappears, the cooling performance for the coil 4 can be further improved.

Besides, modifications illustrated in FIG. 14 to FIG. 17 may be adopted.

Figure 14:
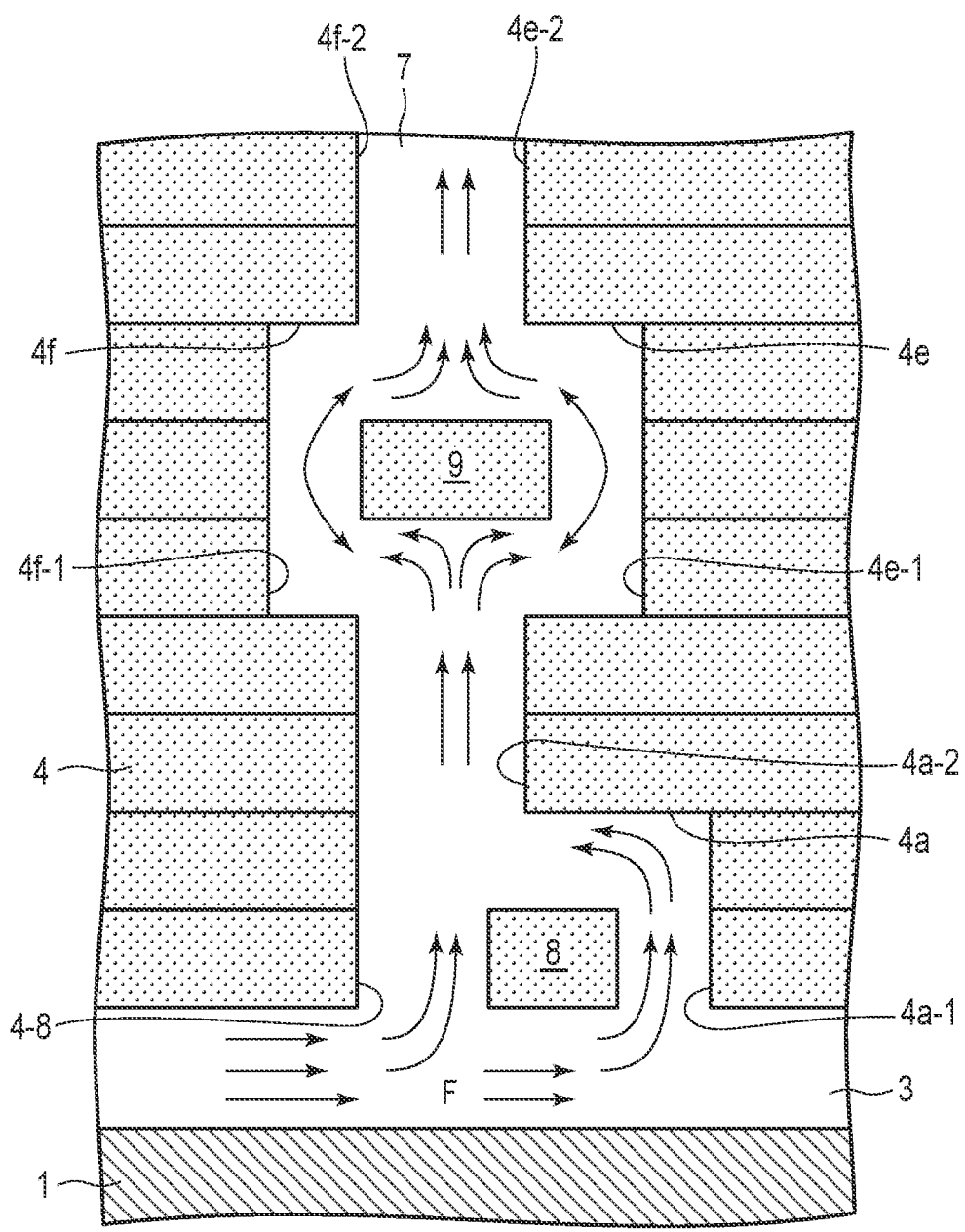
FIG. 14 is a cross-sectional view illustrating a modification of the structure illustrated in FIG. 13.

FIG. 14 is a cross-sectional view illustrating an example in which the structural object 9 is disposed in a flow path located on the radially outward side of the coil airflow path 7 having the cooling gas inlet portion, the vicinity of which has the same structure as the structure illustrated in FIG. 2. In this example, the cooling gas F, which passes through the flow paths divided by the structural object 8 and becomes confluent, passes between a wall surface 4-8 and the wall surface 4a-2, impinges on the structural object 9 disposed between a wall surface 4f-1 and a wall surface 4e-1, flows into flow paths divided by the structural object 9, impinges on a wall surface 4f and a wall surface 4e, becomes confluent, and flows between a wall surface 4f-2 and a wall surface 4e-2.

FIG. 15 is a cross-sectional view illustrating an example in which the structural object 9 is disposed in a path flow located on the radially outward side of the coil airflow path 7 having the cooling gas inlet portion, the vicinity of which has the same structure as the structure illustrated in FIG. 8. In this example, the cooling gas F, which passes through the flow paths divided by the structural object 8 and becomes confluent, passes between the wall surface 4b-2 and the wall surface 4-5, impinges on the structural object 9 disposed between the wall surface 4f-1 and wall surface 4e-1, flows into flow paths divided by the structural object 9, impinges on the wall surface 4f and wall surface 4e, becomes confluent, and flows between the wall surface 4f-2 and wall surface 4e-2.

Figure 16:
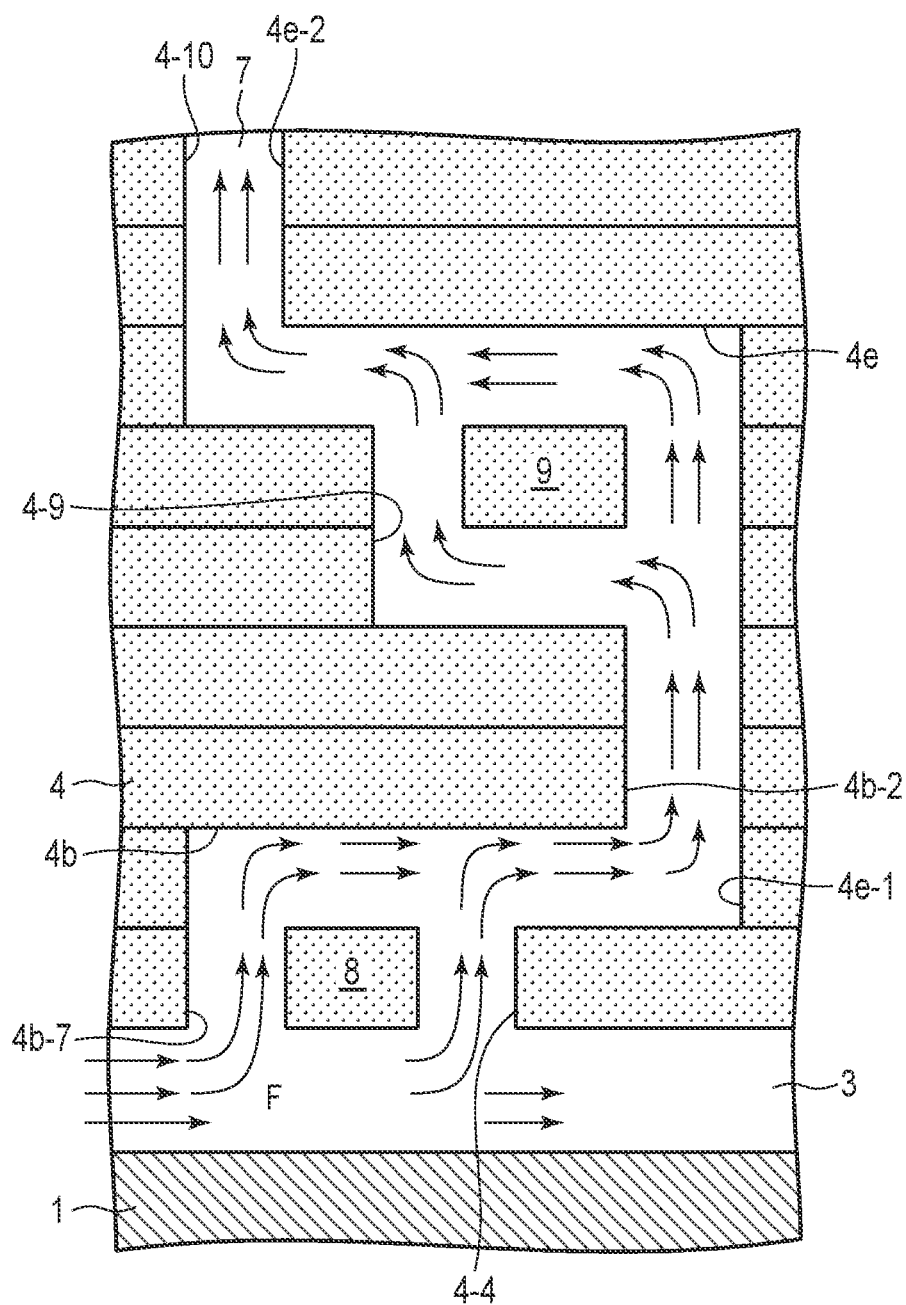
FIG. 16 is a cross-sectional view illustrating a modification of the structure illustrated in FIG. 15.

FIG. 16 is a cross-sectional view illustrating a modification of the structure illustrated in FIG. 15. In this example, the cooling gas F, which passes through the flow paths divided by the structural object 8 and becomes confluent, passes between the wall surface 4b-2 and the wall surface 4e-1, and passes through flow paths divided by the structural object 9 disposed between a wall surface 4-9 and the wall surface 4e-l. At this time, one of the divided flows of the cooling gas passes between the structural object 9 and the wall surface 4-9, and the other flow of the cooling gas passes between the structural object 9 and the wall surface 4e-1 and impinges on the wall surface 4e, and then advances toward the core end portion side. Both flows of the cooling gas become confluent, and the confluent cooling gas advances toward the core end portion side, impinges on a wall surface 4-10, and flows between the wall surface 4-10 and wall surface 4e-2.

Figure 17:
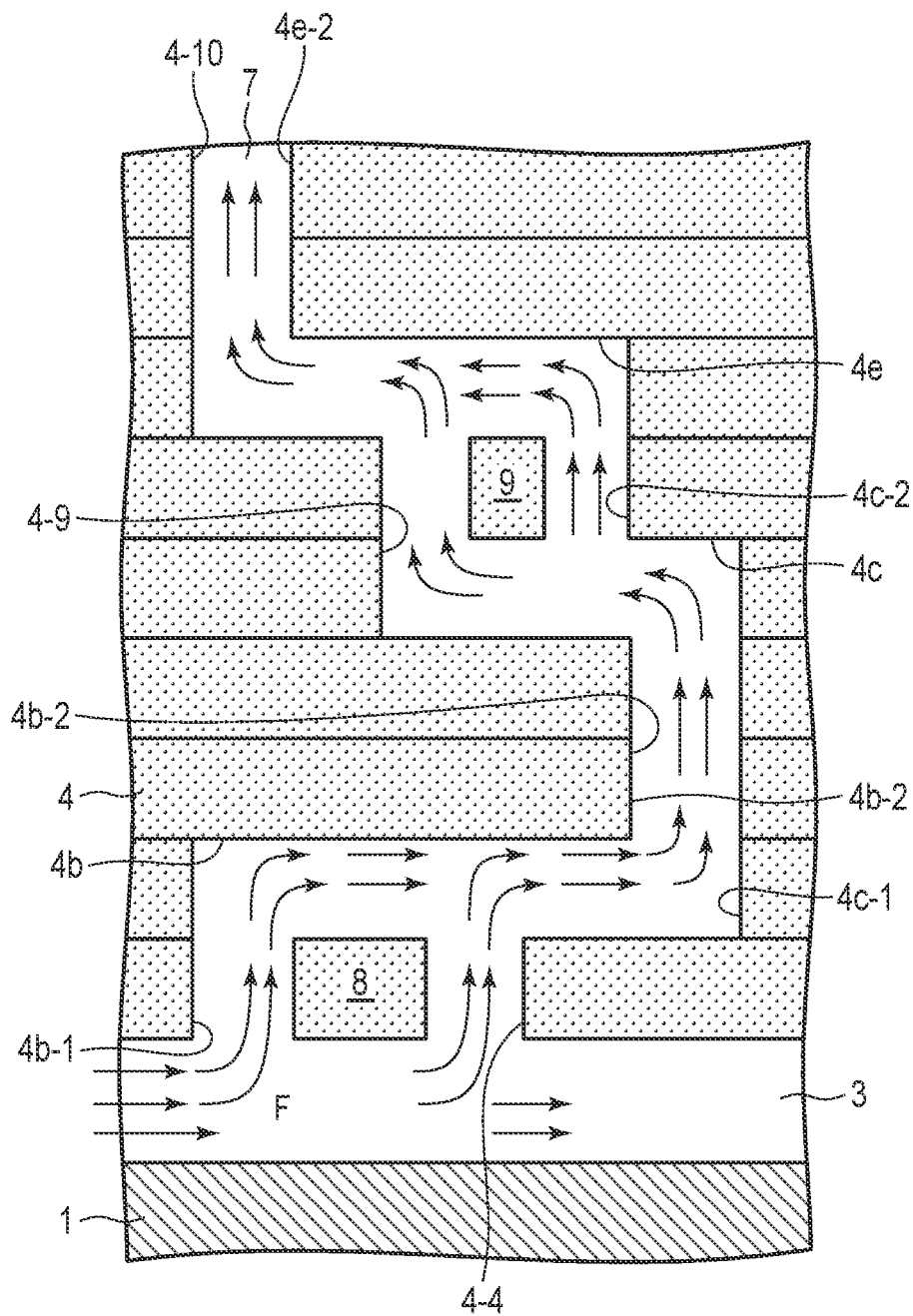
FIG. 17 is a cross-sectional view illustrating a modification of the structure illustrated in FIG. 16.

FIG. 17 is a cross-sectional view illustrating a modification of the structure illustrated in FIG. 16. In this example, the cooling gas F, which passes through the flow paths divided by the structural object 8 and becomes confluent, passes between the wall surface 4b-2 and the wall surface 4c-1, impinges on the wall surface 4c, advances toward the core end portion side, and passes through flow paths divided by the structural object 9 disposed between the wall surface 4-9 and the wall surface 4c-2. At this time, one of the divided flows of the cooling gas impinges on the wall surface 4-9, and passes between the structural object 9 and the wall surface 4-9, and the other flow of the cooling gas passes between the structural object 9 and the wall surface 4c-2 and impinges on the wall surface 4e, and then advances toward the core end portion side. Both flows of the cooling gas become confluent, and the confluent cooling gas advances toward the core end portion side, impinges on the wall surface 4-10, and flows between the wall surface 4-10 and wall surface 4e-2.

In this manner, the structural object 9 can be combined with the structural object 8 and can be applied to coil airflow paths 7 of various modes.

Note that the structural object 9 is disposed in a manner to hinder the flow of the cooling gas F in order to obtain the turbulence action, but it is preferable that the cross-sectional area of the flow path, into which the cooling gas F is branched by the structural object 9, is not less than the cross-sectional area of the flow path at other locations, since the cooling gas amount must not be excessively lowered.

According to the fourth embodiment, since the cooling gas F flows without losing the turbulent flow in the inside of the coil airflow path 7, a high cooling performance can be exhibited not only in the flow path on the rotor radially inward side but also in the flow path on the rotor radially outward side.

Fifth Embodiment

Next, a fifth embodiment will be described with reference to FIG. 18. Hereinafter, a description of parts common to the first and second embodiments will be omitted, and different parts will be mainly described.

Figure 18:
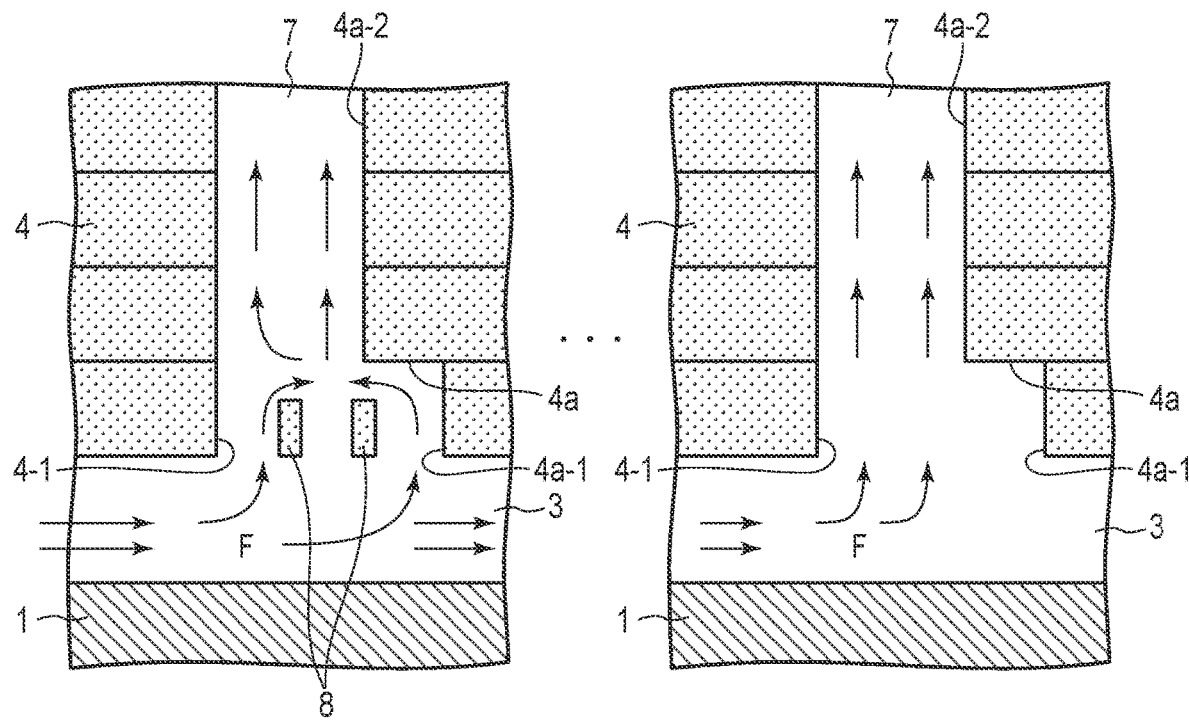
FIG. 18 is a cross-sectional view illustrating an example of a cross-sectional shape at a time when a structure including a coil airflow path, which is applied to a rotor of a rotating electrical machine according to a fifth embodiment, is viewed in a rotor rotational direction (a cross-sectional view illustrating a modification in which the structures illustrated in FIG. 1 and FIG. 2 are applied)

FIG. 18 is a cross-sectional view illustrating a modification in which the structures illustrated in FIG. 1 and FIG. 2 are applied.

The present embodiment is configured such that, in the coil airflow paths 7 arranged in the rotor axial direction, the number of flow paths divided by the structural object 8 decreases from the core end portion toward the core central portion.

The cooling gas F flowing into the coil airflow path 7 from the sub-slot 3 drifts in the cooling gas inlet portion, and thus the disposition of flow paths divided by the structural object 8 is effective in obtaining the turbulence action by impingement. However, since the drift becomes weaker in the coil airflow path 7 closer to the core central portion side, the flow paths divided by the structural object 8 more strongly function as a barrier which causes pressure loss. Accordingly, it is preferable that the number of flow paths divided by the structural object 8 in the axial direction becomes smaller toward the coil airflow paths 7 closer to the core central portion side.

In the example of FIG. 18, among the coil airflow paths 7 arranged in the rotor axial direction, the coil airflow path 7 closest to the core end portion has a greatest number of structural objects 8 (two in this example) and, accordingly, has a greatest number of flow paths divided by the structural objects 8 (three in this example). On the other hand, the coil airflow path 7 closest to the core central portion has a smallest number of structural objects 8 (zero in this example) and, accordingly, has a smallest number of flow paths divided by the structural object 8 (one in this example since the structural object 8 is absent).

Furthermore, the coil airflow paths 7 arranged in the rotor axial direction are configured such that the number of flow paths divided by the structural object 8 in one coil airflow path 7 becomes smaller than the number of flow paths divided by the structural object 8 in another coil airflow path 7 which neighbors the one coil airflow path 7 on the core end portion side. However, the embodiment is not limited to this configuration, and, for example, some coil airflow paths 7 arranged to neighbor each other in the rotor axial direction may be configured to have the same number of flow paths divided by the structural object or objects 8.

According to the fifth embodiment, the number of flow paths divided by the structural object or objects is properly set in accordance with the position of disposition of each coil airflow path 7, and thereby both the increase in the turbulence action and the decrease in the pressure loss can consistently be achieved, and the high cooling performance can be achieved.

Sixth Embodiment

Next, referring to FIG. 19 and FIG. 20, a sixth embodiment will be described. Hereinafter, a description of parts common to the first and second embodiments will be omitted, and different parts will be mainly described.

Figure 19:
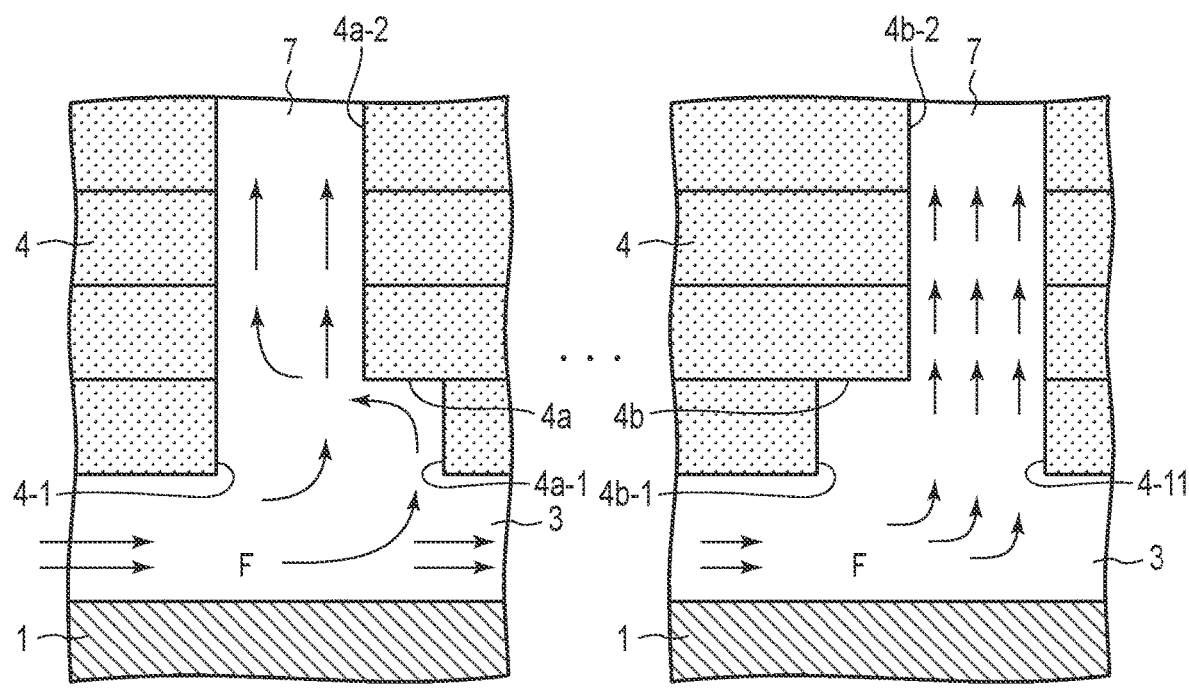
FIG. 19 is a cross-sectional view illustrating an example of a cross-sectional shape at a time when a structure including a coil airflow path, which is applied to a rotor of a rotating electrical machine according to a sixth embodiment, is viewed in a rotor rotational direction (a cross-sectional view illustrating a modification in which the structures illustrated in FIGS. 1 to 3 and the like are applied)

FIG. 19 is a cross-sectional view illustrating a modification in which the structures illustrated in FIGS. 1 to 3 and the like are applied. In addition, FIG. 20 is a cross-sectional view illustrating a modification of the structure illustrated in FIG. 19.

The present embodiment is configured such that, in the coil airflow paths 7 arranged in the rotor axial direction, the area of the wall surface 4a decreases from the core end portion toward the core central portion, or the area of the wall surface 4b increases from the core end portion toward the core central portion. The area of the wall surface 4a and the area of the wall surface 4b can be varied, for example, by varying the length thereof in the rotor axial direction.

The cooling gas F flowing into the coil airflow path 7 from the sub-slot 3 drifts in the cooling gas inlet portion, and thus the disposition of the wall surface 4a located on the core central portion side of the cooling gas inlet portion is effective in obtaining the turbulence action by impingement. However, since the drift becomes weaker in the coil airflow path 7 closer to the core central portion side, the wall surface 4a more strongly functions as a barrier which causes pressure loss. Accordingly, it is preferable that the area of the wall surface 4a becomes smaller toward the coil airflow paths 7 which are located closer to the core central portion side. On the other hand, if the drift becomes weaker, the wall surface 4b has a stronger turbulence action by impingement than an action as a barrier which causes pressure loss. Accordingly, it is preferable that the area of the wall surface 4b becomes greater in the coil airflow path closer to the core central portion side.

In the example of FIG. 19, among the coil airflow paths 7 arranged in the rotor axial direction, the coil airflow path 7 closest to the core end portion has a greatest area of the wall surface 4a and has a smallest area of the wall surface 4b (in this example, the area of the wall surface 4b is zero, and the wall surface 4-1 without a stepped portion is formed). On the other hand, the coil airflow path 7 closest to the core central portion has a smallest area of the wall surface 4a (in this example, the area of the wall surface 4a is zero, and a wall surface 4-11 without a stepped portion is formed) and has a largest area of the wall surface 4b.

Furthermore, the coil airflow paths 7 arranged in the rotor axial direction are configured such that the area of the wall surface 4a in one coil airflow path 7 becomes smaller than the area of the wall surface 4a in another coil airflow path 7 which neighbors the one coil airflow path 7 on the core end portion side. In addition, the area of the wall surface 4b in one coil airflow path 7 becomes greater than the area of the wall surface 4b in another coil airflow path 7 which neighbors the one coil airflow path 7 on the core end portion side. However, the embodiment is not limited to this configuration, and, for example, some coil airflow paths 7 arranged to neighbor each other in the rotor axial direction may be configured to have the same area of the wall surface 4a, 4b.

In the example of FIG. 19, the case is illustrated in which both the area of the wall surface 4a and the area of the wall surface 4b are varied in the rotor axial direction. However, the embodiment is not limited to this example. For example, as illustrated in FIG. 20, it is possible to adopt such a configuration that only the area of the wall surface 4a is varied in the rotor axial direction.

According to the sixth embodiment, the area of the wall surface 4a or the area of the wall surface 4b is properly set in accordance with the position of disposition of each coil airflow path 7, and thereby both the increase in the turbulence action and the decrease in the pressure loss can consistently be achieved, and the high cooling performance can be achieved.

Seventh Embodiment

Next, referring to FIG. 21 and FIG. 23, a seventh embodiment will be described. Hereinafter, a description of parts common to the first to third embodiments will be omitted, and different parts will be mainly described.

Figure 21:
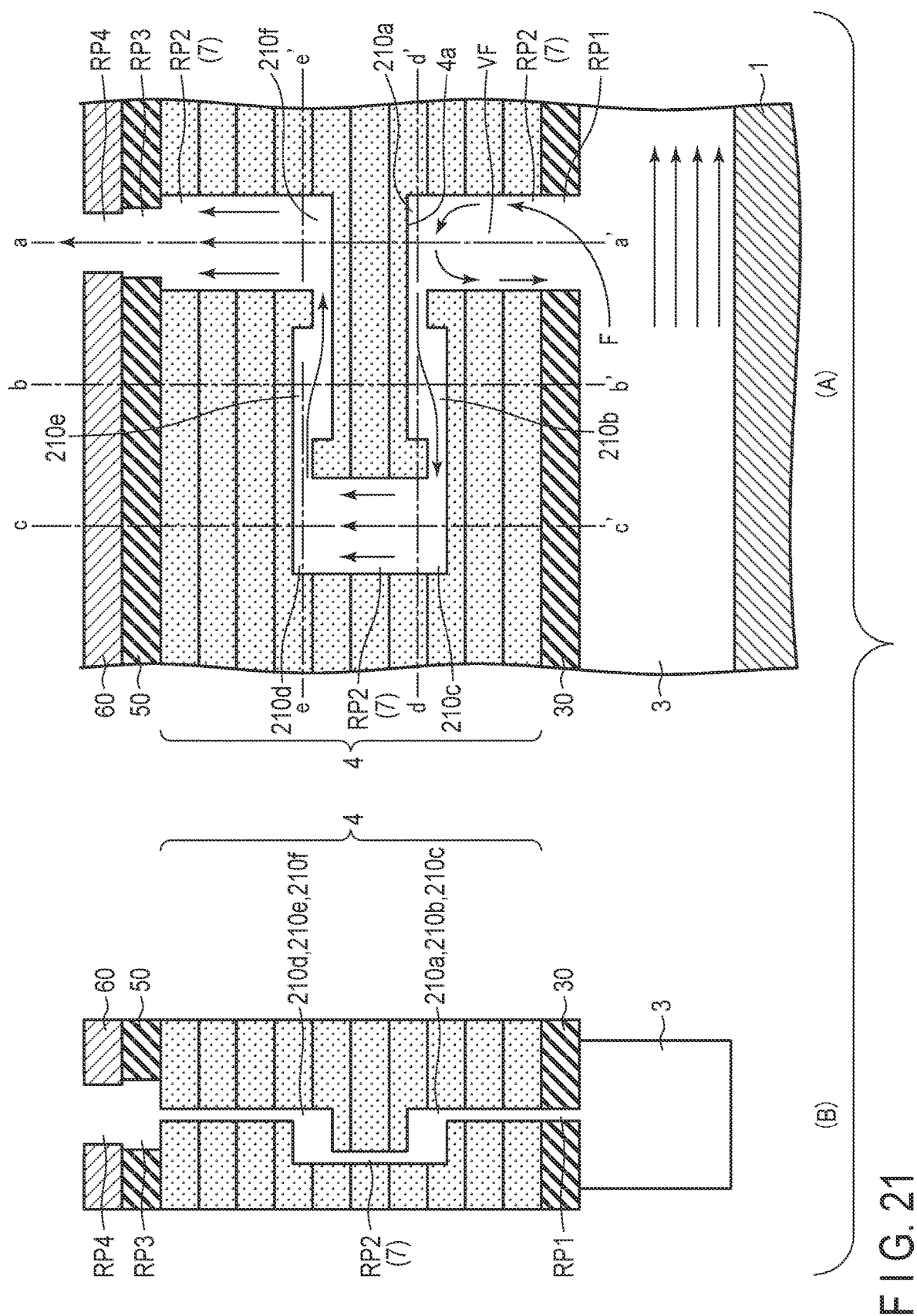
FIG. 21 is a cross-sectional view illustrating an example of a cross-sectional shape at a time when a structure including a coil airflow path, which is applied to a rotor of a rotating electrical machine according to a seventh embodiment, is viewed in a rotor rotational direction, and is a conceptual view illustrating a shape at a time when the coil airflow path is viewed in a see-through manner in the rotor axial direction.

Part (A) of FIG. 21 is a cross-sectional view illustrating an example of a cross-sectional shape at a time when a structure including a coil airflow path, which is applied to a rotor of a rotating electrical machine according to the seventh embodiment, is viewed in a rotor rotational direction. Part (B) of FIG. 21 is a conceptual view illustrating a shape at a time when the coil airflow path illustrated in part (A) of FIG. 21 is viewed in a see-through manner in the rotor axial direction.

Figure 22:
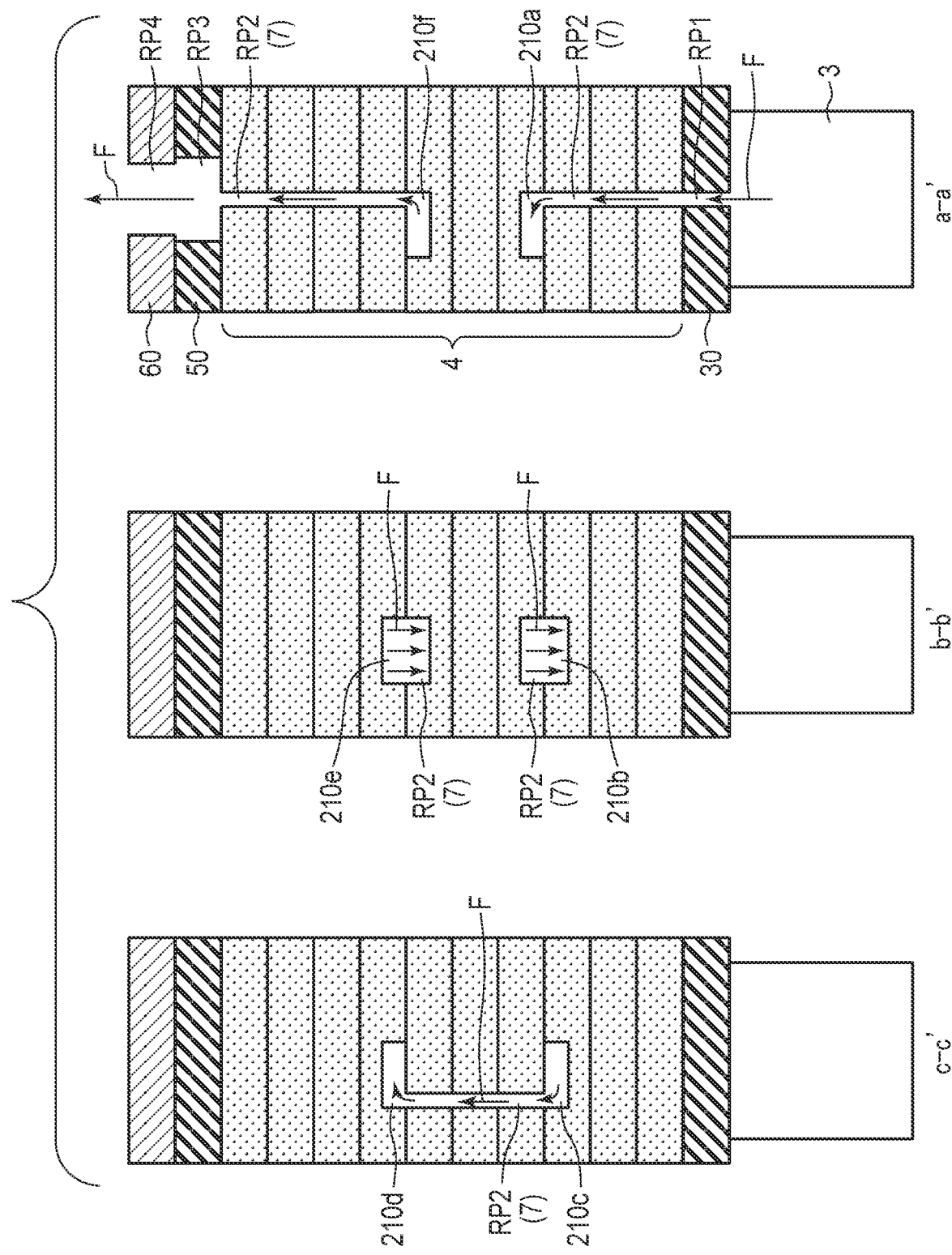
FIG. 22 is cross-sectional views illustrating examples of cross-sectional shapes of an a-a' cross section, a b-b' cross section and a c-c' cross section in FIG. 21 (cross-sectional shapes as viewed in the rotor axial direction)

In addition, FIG. 22 is cross-sectional views illustrating examples of cross-sectional shapes of an a-a' cross section, a b-b' cross section and a c-c' cross section in part (A) of FIG. 21 (cross-sectional shapes as viewed in the rotor axial direction). FIG. 23 is cross-sectional views illustrating examples of cross-sectional shapes of a d-d' cross section and an e-e' cross section in part (A) FIG. 21 (cross-sectional shapes as viewed in the rotor radial direction).

In the present embodiment, among the coil airflow paths 7 arranged in the rotor axial direction, at least one coil airflow path 7 includes at least one of a first portion (e.g. a flow direction changing portion 210a, 210d) which changes the flow direction of the cooling gas F from the rotor radially outward direction to a rotor circumferential direction, and further changes the flow direction to the rotor axial direction; a second portion (e.g. a flow direction changing portion 210b, 210e) which changes the flow direction of the cooling gas F from the rotor axial direction to a rotor radially inward direction, and further changes the flow direction back to the rotor axial direction; and a third portion (e.g. a flow direction changing portion 210c, 210f) which changes the flow direction of the cooling gas F from the rotor axial direction to the rotor circumferential direction, and further changes the flow direction to the rotor radially outward direction.

Figure 23:
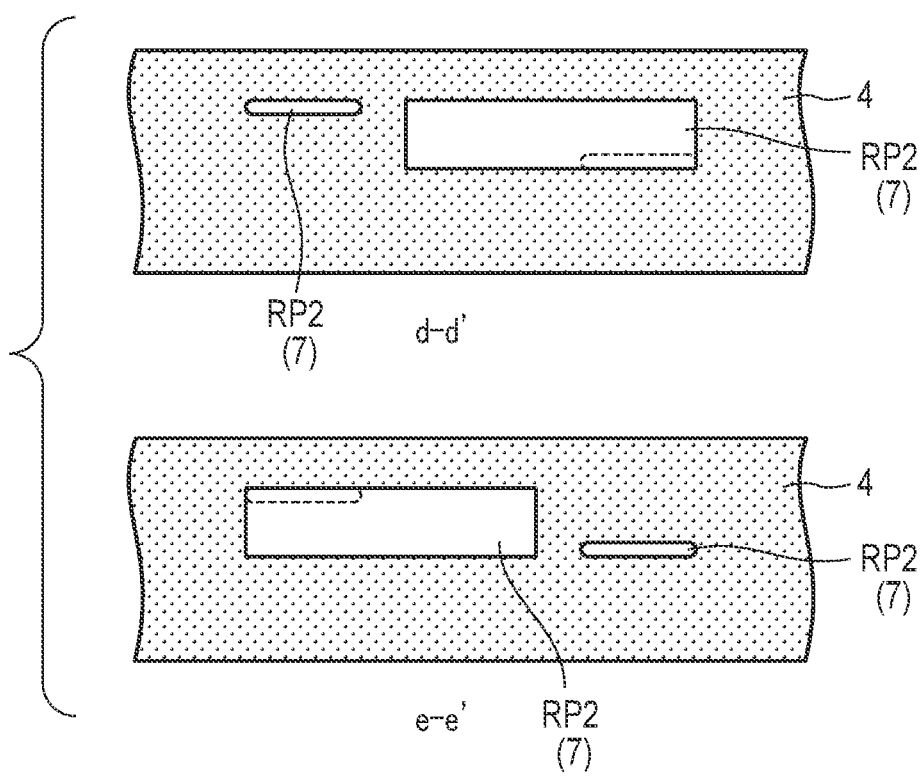
FIG. 23 is cross-sectional views illustrating examples of cross-sectional shapes of a d-d' cross section and an e-e' cross section in FIG. 21 (cross-sectional shapes as viewed in the rotor radial direction)

FIG. 21 to FIG. 23 illustrate an example of the case in which the rotor includes all of the above-described first to third portions.

The rotor includes, on the rotor radially outward side of the sub-slot 3, an underlying plate 30, a rotor coil 4, a creepage block 50, and a rotor wedge 60. An airflow path, which is formed in a manner to successively penetrate these components, is composed of a flow path RP1 in the underlying plate 30, a flow path RP2 in the rotor coil 4 (corresponding to the coil airflow path 7), a flow path RP3 in the creepage block 50, and a flow path RP4 in the rotor wedge 60.

A plurality of flow direction changing portions 210a, 210b, 210c, 210d, 210e and 210f, which change the flow direction of the cooling gas F, are disposed at key points of the flow path RP2 of the rotor coil 4.

In this structure, when the cooling gas F flows from the sub-slot 3 into the flow paths RP1 and RP2, there occurs a flow which breaks away from the core end portion side and drifts toward a wall side located on the core central portion side, and the cooling gas F impinges on the wall surface 4a of the flow direction changing portion 210a. Then, a vortex VF occurs, and the cooling gas F advances (spreads) in the rotor circumferential direction along the wall surface 4a, and the cooling gas F is guided toward the core end portion side through the flow path RP2 which is wide in the rotor circumferential direction.

The cooling gas F, which advances from the flow direction changing portion 210a toward the core end portion side, impinges on a wall surface of the flow direction changing portion 210b that is located forward, and the flow direction is changed to the rotor radially inward direction. Further, the cooling gas F impinges on another wall surface of the flow direction changing portion 210b, and the flow direction of the cooling gas F is changed back toward the core end portion side.

The cooling gas F, which advances from the flow direction changing portion 210b toward the core end portion side, impinges on the wall surface of the flow direction changing portion 210c that is located forward, and the cooling gas F advances in the rotor circumferential direction along this wall surface, and is guided and advances to the rotor radially outward side through the flow path RP2 that is narrowed in the rotor circumferential direction.

The cooling gas F, which advances from the flow direction changing portion 210c toward the rotor radially outward side, impinges on the wall surface of the flow direction changing portion 210d that is located forward, and the cooling gas F advances (spreads) in the rotor circumferential direction along the wall surface 4a, and the cooling gas F is guided toward the core central end portion side through the flow path RP2 which is wide in the rotor circumferential direction.

The cooling gas F, which advances from the flow direction changing portion 210d toward the core central portion side, impinges on a wall surface of the flow direction changing portion 210e that is located forward, and the flow direction of the cooling gas F is changed to the rotor radially inward direction. Further, the cooling gas F impinges on another wall surface of the flow direction changing portion 210e, and the flow direction is changed back to the core central portion side.

The cooling gas F, which advances from the flow direction changing portion 210e toward the core central portion side, impinges on a wall surface of the flow direction changing portion 210f that is located forward, and the cooling gas F advances in the rotor circumferential direction along this wall surface. Then, the cooling gas F is guided toward the rotor radially outward side through the flow path RP2 which is narrowed in the rotor circumferential direction.

According to the seventh embodiment, since various flow direction changing portions are provided in the flow path RP2 (corresponding to the coil airflow path 7), turbulent flows occur by the impingement of the cooling gas upon the wall surfaces of the flow direction changing portions, and thus heat conduction is promoted. Furthermore, since the flow path portions with increased flow path widths are provided, the heat conduction areas and cooling ranges increase in these portions, and the cooling performance can be further improved.

As described above in detail, according to each of the embodiments, the rotor coil can effectively be cooled.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made. The accompanying claims and their equivalents are intended to cover such forms or modifications as would fall within the scope of the inventions.

The invention claimed is:

1. A rotor of a rotating electrical machine, the rotor comprising:
   a coil slot configured to store a rotor coil;
   a sub-slot configured to introduce a cooling gas from a core end portion and to pass the cooling gas toward a core central portion in a rotor axial direction; and
   a plurality of coil airflow paths arranged in the rotor axial direction, each of the coil airflow paths being provided in the rotor coil and configured to introduce the cooling gas flowing in the sub-slot and to pass the cooling gas toward a rotor radially outward side, such that the cooling gas flowing into the sub-slot branches and flows into the respective coil airflow paths,
   wherein at least one coil airflow path among the coil airflow paths comprises:
   a first wall surface disposed on a core central portion side of a cooling gas inlet portion of the coil airflow path;
   a second wall surface disposed on the core central portion side of an inside of the coil airflow path, and located on an opposite side of a flowing direction of the cooling gas through the sub-slot with respect to the first wall surface, more on the rotor radially outward side and more on a core end portion side than the first wall surface; and
   a third wall surface configured to connect the first wall surface and the second wall surface, the third wall surface including a surface perpendicular to a rotor radial direction,
   wherein the at least one coil airflow path is configured such that the cooling gas that enters from the sub-slot toward the first wall surface collides with the third wall surface and thereby flows in a direction opposite a direction of the cooling gas flowing through the sub-slot.

2. The rotor of the rotating electrical machine according to claim 1, wherein the at least one coil airflow path is configured to cause part of the cooling gas flowing in the sub-slot to flow into a plurality of flow paths, which are divided by a first structural object, in the cooling gas inlet portion of the coil airflow path, and to make flows of the cooling gas passing through the flow paths confluent in the coil airflow path.

3. The rotor of the rotating electrical machine according to claim 2, wherein the plurality of flow paths are disposed to be arranged in the rotor axial direction.

4. The rotor of the rotating electrical machine according to claim 2, wherein the plurality of flow paths are disposed to be arranged in a rotor rotational direction.

5. The rotor of the rotating electrical machine according to claim 2, wherein the at least one coil airflow path is configured to cause the cooling gas, which passes through the flow paths divided by the first structural object and is made confluent, to further flow into a plurality of flow paths which are divided by a second structural object in the inside of the coil airflow path, and make the cooling gas, which passes through the flow paths, confluent in the coil airflow path.

6. The rotor of the rotating electrical machine according to claim 2, wherein in the coil airflow paths, a number of flow paths divided by the first structural object decreases from the core end portion toward the core central portion.

7. The rotor of the rotating electrical machine according to claim 1, wherein the at least one coil airflow path includes:
   a fourth wall surface disposed on the core end portion side of the cooling gas inlet portion of the coil airflow path;
   a fifth wall surface disposed on the core end portion side of the inside of the coil airflow path, and located more on the rotor radially outward side and more on the core central portion side than the fourth wall surface; and
   a sixth wall surface configured to connect the fourth wall surface and the fifth wall surface, the sixth wall surface including a surface perpendicular to the rotor radial direction.

8. The rotor of the rotating electrical machine according to claim 7, wherein each of the coil airflow paths is configured such that a wall surface on the core central portion side includes at least either the first to third wall surfaces or the fourth to sixth wall surfaces, and
   each of the coil airflow paths is configured such that an area of the third wall surface decreases from the core end portion toward the core central portion, or an area of the sixth wall surface increases from the core end portion toward the core central portion.

9. The rotor of the rotating electrical machine according to claim 1, wherein the at least one coil airflow path is configured such that the second wall surface disposed on the core central portion side of the inside of the coil airflow path is located more on the core end portion side than a wall surface disposed on the core end portion side of the cooling gas inlet portion of the coil airflow path.

* * * * *